United States Patent
Lee et al.

(10) Patent No.: US 10,542,447 B2
(45) Date of Patent: Jan. 21, 2020

(54) METHOD AND DEVICE FOR REPORTING MEASUREMENT RESULT BY TERMINAL IN COVERAGE EXPANSION AREA

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 15/537,836

(22) PCT Filed: Dec. 23, 2015

(86) PCT No.: PCT/KR2015/014186
§ 371 (c)(1),
(2) Date: Jun. 19, 2017

(87) PCT Pub. No.: WO2016/108504
PCT Pub. Date: Jul. 7, 2016

(65) Prior Publication Data
US 2017/0374574 A1    Dec. 28, 2017

Related U.S. Application Data

(60) Provisional application No. 62/097,591, filed on Dec. 30, 2014, provisional application No. 62/100,489, (Continued)

(51) Int. Cl.
*H04W 24/00* (2009.01)
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
CPC ............. H04W 24/10; H04W 36/0058; H04W 36/0085; H04W 36/0094; H04W 72/1231
See application file for complete search history.

(56) References Cited

U.S. PATENT DOCUMENTS

2012/0142352 A1* 6/2012 Zhang ............... H04W 36/0072
    455/436
2013/0208587 A1* 8/2013 Bala ...................... H04W 16/14
    370/230

(Continued)

FOREIGN PATENT DOCUMENTS

| KR | 1020140129744 | 11/2014 |
|----|---------------|---------|
| WO | 2011136557    | 11/2011 |

(Continued)

OTHER PUBLICATIONS

PCT International Application No. PCT/KR2015/014186, International Search Report dated Mar. 25, 2016, 2 pages.

(Continued)

*Primary Examiner* — Charles C Jiang
*Assistant Examiner* — Kenan Cehic
(74) *Attorney, Agent, or Firm* — Lee Hong Degerman Kang & Waimey

(57) ABSTRACT

Disclosed are a method for reporting a measurement result by a terminal in a coverage expansion area in a wireless communication system and a device for supporting same. The terminal can receive a measurement configuration from a network, measure a cell, and report to the network measurement state information and a measurement result of the measured cell. The measurement state information can comprise information which indicates whether the cell has been (Continued)

measured in a coverage enhancement (CE) mode or a normal mode.

13 Claims, 23 Drawing Sheets

Related U.S. Application Data filed on Jan. 7, 2015, provisional application No. 62/112,655, filed on Feb. 6, 2015.

(56) References Cited

U.S. PATENT DOCUMENTS

| | | | | |
|---|---|---|---|---|
| 2014/0098761 A1* | 4/2014 | Lee | | H04W 74/006 |
| | | | | 370/329 |
| 2014/0161093 A1* | 6/2014 | Hoshino | | H04B 7/024 |
| | | | | 370/329 |
| 2014/0198772 A1* | 7/2014 | Baldemair | | H04L 27/2655 |
| | | | | 370/335 |
| 2015/0016312 A1* | 1/2015 | Li | | H04W 74/0833 |
| | | | | 370/280 |
| 2015/0085795 A1* | 3/2015 | Papasakellariou | | H04L 5/006 |
| | | | | 370/329 |
| 2015/0215799 A1* | 7/2015 | Kazmi | | H04W 24/08 |
| | | | | 370/252 |
| 2016/0205574 A1* | 7/2016 | Behravan | | H04W 48/16 |
| | | | | 370/252 |
| 2016/0323798 A1* | 11/2016 | Horn | | H04W 36/165 |
| 2017/0171764 A1* | 6/2017 | Dimou | | H04W 4/70 |
| 2017/0214495 A1* | 7/2017 | Golitschek Edler von Elbwart | | H04L 1/1671 |
| 2018/0007597 A1* | 1/2018 | Futaki | | H04W 4/70 |

FOREIGN PATENT DOCUMENTS

| | | |
|---|---|---|
| WO | 2014010892 | 1/2014 |
| WO | 2014021695 | 2/2014 |

OTHER PUBLICATIONS

Sony, "Enhanced Coverage Mobility Issues", R2-133821, 3GPP TSG-RAN WG2 Meeting #84, Nov. 2013, 4 pages.

* cited by examiner

METHOD AND DEVICE FOR REPORTING MEASUREMENT RESULT BY TERMINAL IN COVERAGE EXPANSION AREA

CROSS-REFERENCE TO RELATED APPLICATIONS

This application is the National Stage filing under 35 U.S.C. 371 of International Application No. PCT/KR2015/014186, filed on Dec. 23, 2015, which claims the benefit of U.S. Provisional Applications No. 62/097,591, filed on Dec. 30, 2014, 62/100,489, filed on Jan. 7, 2015 and 62/112,655, filed on Feb. 6, 2015, the contents of which are all hereby incorporated by reference herein in their entirety.

BACKGROUND OF THE INVENTION

Field of the Invention

The present invention relates to a wireless communication system, and more particularly, to a method for reporting, by a user equipment (UE) in a coverage enhancement area, a measurement result in a wireless communication system, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

SUMMARY OF THE INVENTION

The present invention provides a method for reporting, by a user equipment (UE) in a coverage enhancement area, a measurement result in a wireless communication system, and a device supporting the same. The UE may receive a measurement configuration from a network and may receive a predefined threshold. The UE may perform measurement on a cell, in which the UE may determine whether to perform measurement in a coverage enhancement (CE) mode or in a normal mode by comparing a specific value measured by the UE with the predefined threshold. The UE may report, to the network, a measurement result and measurement state information indicating whether the cell is measured in the CE mode or in the normal.

One embodiment provides a method for a method for reporting, by a UE in a coverage enhancement area, a measurement result in a wireless communication system. The UE may include: receiving a measurement configuration from a network; measuring a cell; and reporting a measurement result of the measured cell and measurement state information to the network, wherein the measurement state information may include information indicating whether the cell is measured in a coverage enhancement (CE) mode or in a normal mode, and the CE mode may be a mode in which the cell measured for a longer time than in the normal mode.

The measurement state information may include information indicating that a result measured in the CE mode has lower accuracy than a result measured in the normal mode.

The measurement state information may include a number of times downlink reception of a particular message or particular channel is repeated for successful downlink reception of the particular message or particular channel or a number of times uplink transmission of a particular message or particular channel is repeated for successful uplink transmission of the particular message or particular channel.

The measurement state information may include information indicating whether the cell is measured based on CSI-RS-based DRS measurement.

The measurement configuration may include a predefined RSRP threshold, and when an RSRP threshold of the cell measured by the UE is the predefined RSRP threshold or lower, the cell may be measured in the CE mode.

The measurement configuration may include a predefined first RSRP threshold in a first CE level and a predefined second RSRP threshold in a second CE level; the cell may be measured in the first CE level when an RSRP threshold of the cell measured by the UE exceeds the first RSRP threshold; the cell may be measured in the second CE level when the RSRP threshold of the cell measured by the UE exceeds the second RSRP threshold and is the first RSRP threshold or lower; the first RSRP threshold may be greater than the second RSRP threshold; and the second CE level may have a wider range of enhanced coverage than the first CE level.

The measurement configuration may include a predefined RSRQ threshold, and when an RSRQ threshold of the cell measured by the UE is the predefined RSRQ threshold or lower, the cell may be measured in the CE mode.

The measurement configuration may include a threshold for downlink reception, and when a number of times the UE performs repetitions for downlink reception exceeds the threshold for downlink reception, the cell may be measured in the CE mode.

The measurement configuration may include a threshold for uplink transmission, and when a number of times the UE performs repetitions for uplink transmission exceeds the threshold for uplink transmission, the cell may be measured in the CE mode.

The measurement configuration may include a period information indicator, and the period information indicator may indicate that measurement is to be performed only in the CE mode during an indicated period.

The measurement configuration may include a CE mode report indicator, and the CE mode report indicator may indicate that only a result measured in the CE mode is to be reported among measurement results of the cell.

The measurement state information may be reported to the network along with at least one of radio link failure information, handover failure information, a logged measurement result, and a measurement result on an MBSFN area.

The cell may be either an intra-LTE cell or an inter-RAT cell.

The UE may be in an RRC_IDLE state.

Another embodiment provides a UE reporting a measurement result in a wireless communication system. The UE may include: a memory; a transceiver; and a processor to connect the memory and the transceiver, wherein the processor may control the transceiver to receive a measurement configuration from a network; may measure a cell; and may control the transceiver to report a measurement result of the measured cell and measurement state information to the network, the measurement state information may include information indicating whether the cell is measured in a CE mode or in a normal mode, and the CE mode may be a mode in which the cell is measured for a longer time than in the normal mode.

A network may accurately interpret a measurement result measured by a UE in a coverage enhancement area.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
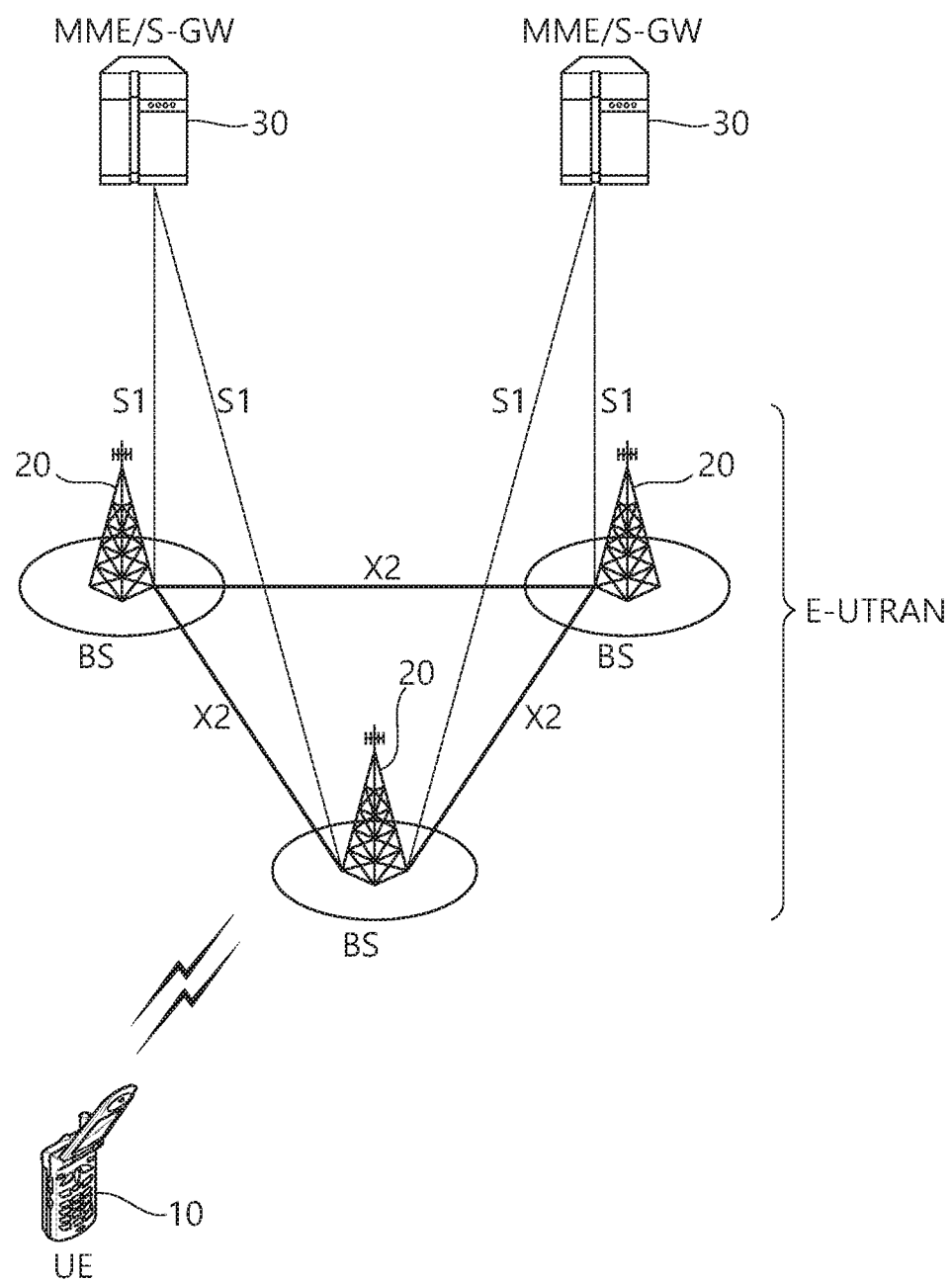
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

An E-UTRAN includes a base station (BS) 20 that provides a control plane and a user plane to a user equipment (UE) 10. The UE 10 may be fixed or mobile, and may be referred to by other name, such as a mobile station (MS), a user terminal (UT), User, a user equipment (UE), a subscriber station (SS), a wireless device, or the like. The BS 20 generally refers to a fixed station that communicates with the UE 10 and may be called by other name, such as an eNB (evolved-Node B), a BTS (Base Transceiver System), an access point, or the like.

The BSs 20 may be connected with each other via an X2 interface. The BS 20 is connected to an EPC (Evolved Packet Core) 30 via an S1 interface. Specifically, the BSs 20 are connected to an MME (Mobility Management Entity) via S1-MME and to an S-GW (Serving Gateway) via S1-U.

The EPC 30 includes an MME, an S-GW, and a P-GW (Packet Data Network-Gateway). The MME retains information regarding a UE access or information regarding UE capability, and such information is largely used to manage UE mobility. The S-GW is a gateway having an E-UTRAN as a terminal point and the P-GW is a gateway having a PDN as a terminal point.

Layers of the radio interface protocols between a UE and a network may be divided into a first layer L1, a second layer L2, and a third layer L3 based on the three lower layers of an open system interconnection (OSI) standard model widely known in communication systems. The physical layer belonging to the first layer (L1) provides an information transfer service using a physical channel, and an RRC (Radio Resource Control) layer positioned in the third layer serves to control radio resources between the UE and the network. To this end, the RRC layer exchanges an RRC message between the UE and the network.

Figure 2:
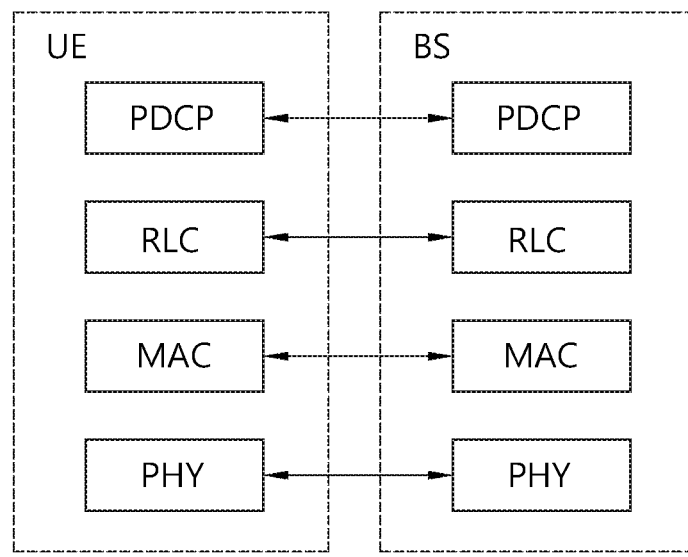
FIG. 2 is a block diagram showing a radio protocol architecture with respect to a user plane.
Figure 3:
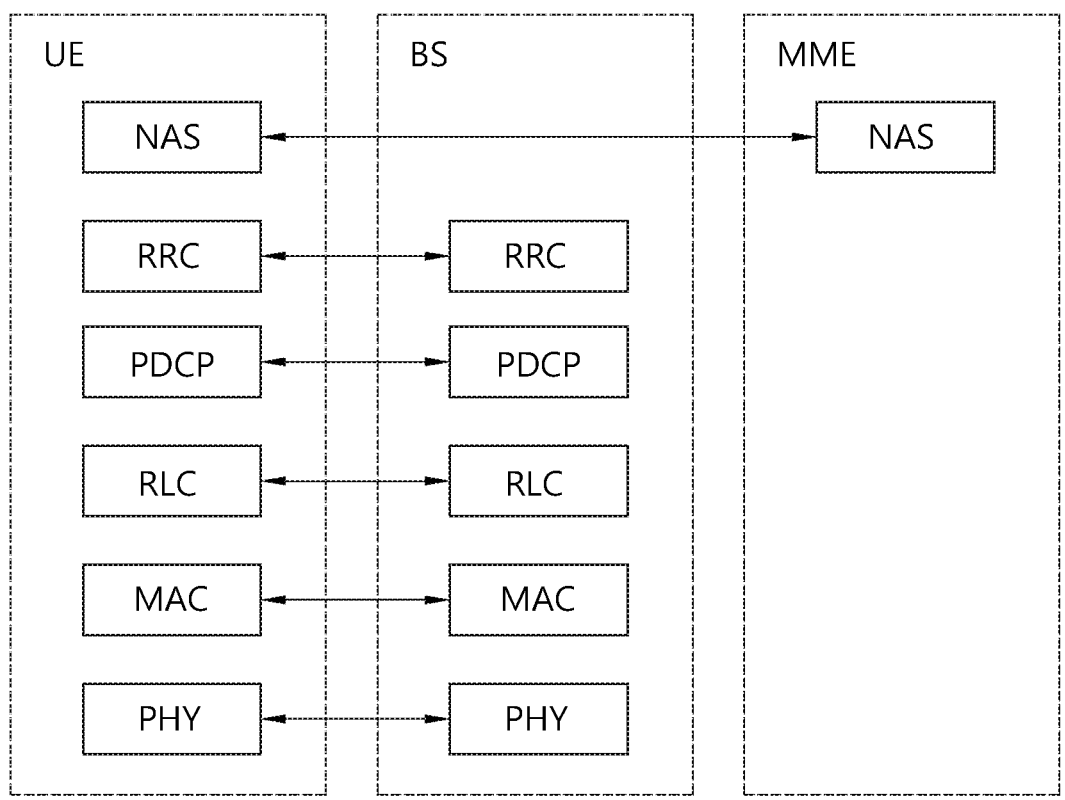
FIG. 3 is a block diagram showing a radio protocol architecture with respect to a control plane.

FIG. 2 is a block diagram showing a radio protocol architecture with respect to a user plane. FIG. 3 is a block diagram showing a radio protocol architecture with respect to a control plane. The user plane is a protocol stack for transmitting user data, and the control plane is a protocol stack for transmitting a control signal.

Referring to FIGS. 2 and 3, the physical layer provides an information transfer service to an upper layer by using a physical channel. The physical layer is connected to a medium access control (MAC) layer via a transport channel. Data is transferred between the MAC layer and the physical layer via the transport channel. Transport channels are classified depending on how and with what kind of characteristics data is transmitted through a radio interface.

Between different physical layers, namely, between physical layers of a transmitter and a receiver, data is transferred via the physical channel. The physical channel may be modulated according to an OFDM (Orthogonal Frequency Division Multiplexing) scheme, and time and frequency may be utilized as radio resources.

Functions of the MAC layer include mapping between a logical channel and a transport channel and multiplexing/demultiplexing an MAC SDU (service data unit) belonging to a logical channel into a transport block belonging to a physical channel via a transport channel. The MAC layer provides a service to an RLC (radio link control) layer through a logical channel.

Functions of the RLC layer include concatenation, segmentation, and reassembly of an RLC SDU. In order to guarantee various QoS (Quality of Service) required by a radio bearer (RB), the RLC layer provides three types of operation modes: a transparent mode (TM), an unacknowledged mode (UM), and an acknowledged mode (AM). An AM RLC provides an error correction through an ARQ (automatic repeat request).

The RRC (Radio Resource Control) layer is defined only in the control plane. The RRC layer handles controlling of a logical channel, a transport channel, and a physical channel in relation to configuration, re-configuration, and releasing of radio bearers (RBs). RB refers to a logical path provided by the first layer (PHY layer) and the second layers (MAC layer, RLC layer, and PDCP layer) to transfer data between a UE and a network.

A PDCP (Packet Data Convergence Protocol) layer in the user plane performs a transfer of a user data, header compression, and ciphering. Functions of the PDCP in the control plane include transfer of control plane data and ciphering/integrity protection.

Setting of an RF refers to defining characteristics of radio protocol layers and channels and configuring detailed parameters and operation methods to provide a particular service. RBs may be divided into two types: SRB (Signaling RB) and DRB (Data RB). The SRB is used as a passage for transmitting an RRC message on the control plane, and the DRB is used as a passage for transferring an RRC message on the user plane.

When there is an RRC connection between the RRC of the UE and that of the E-UTRAN, the UE is in an RRC-connected mode, or otherwise, the UE is in an RRC idle mode.

Downlink transport channels for transmitting data from the network to the UE includes a BCH (Broadcast Channel) for transmitting system information and a DL-SCH (Downlink-Shared Channel) for transmitting user traffic or a control message. Traffic or a control message of a downlink multicast or broadcast service may be transmitted via the DL-SCH or an extra downlink MCH (Multicast Channel). Meanwhile, uplink transport channels for transmitting data from the UE to the network includes an RACH (Random Access Channel) for transmitting an initial control message and a UL-SCH (Uplink-Shared Channel) for transmitting user traffic or a control message.

Logical channels positioned at a higher level and mapped to a transport channel includes a BCCH (Broadcast Channel), a PCCH (Paging Control Channel), a CCCH (Common Control Channel), an MCCH (Multicast Control Channel), an MTCH (Multicast Traffic Channel), or the like.

A physical channel is comprised of several OFDM symbols in a time domain and several subcarriers in a frequency domain. A single subframe includes a plurality of OFDM symbols in the time domain. A resource bock is a resource allocation unit, which includes a plurality of OFDM symbols and a plurality of subcarriers. Each subframe may use particular subcarriers of particular OFDM symbols (e.g., first OFDM symbol) of a corresponding subframe for a PDCCH (Physical Downlink Control Channel), namely, for an L1/L2 control channel. A TTI (Transmission Time Interval) is a unit time of a subframe transmission.

Hereinafter, an RRC state and an RRC connection method will be described.

An RRC state refers to whether or not an RRC layer of a UE is logically connected to that of the E-UTRAN. When the RRC layer of the UE is logically connected to that of the E-UTRAN, it is called an RRC connected state, and or otherwise, it is called an RRC idle state. When the UE is in the RRC connected state, since the RRC connection exists, the E-UTRAN can recognize the presence of the corresponding UE by cell, and thus, the E-UTRAN can effectively control the UE. Meanwhile, when the UE is in the RRC idle state, the E-UTRAN cannot recognize the UE in the RRC idle state, and the UE is managed by a core network (CN) by track area unit larger than a cell. Namely, the UE in the RRC idle state is recognized as to whether or not it is present by the larger area unit, and in order for the UE in the RRC idle state to receive a general mobile communication service such as a voice or data, the UE in the RRC idle state is to be changed to the RRC connected state.

When the user first turns on power of a UE, the UE first searches for an appropriate cell and remains in an RRC idle state in the corresponding cell. When the UE in the RRC idle state is required to be RRC connected, the UE establishes an RRC connection with the E-UTRAN through an RRC connection procedure and transitions to the RRC connection state. When the UE in the RRC idle state may need to establish an RRC connection for various reasons. For example, the UE in the RRC idle state may establish an RRC connection when a transmission of uplink data is required as the user attempts to make a call, or the like, or when a response is required to be transmitted as a paging message is received from the E-UTRAN.

A NAS (Non-Access Stratum) layer positioned at a higher level of the RRC layer performs functions such as session management, mobility management, and the like.

In order for the NAS layer to manage mobility of the UE, two states of EMM-REGISTERED (EPS Mobility Management-REGISTERED) and EMM-DEREGISTERED are defined, and these two states are applied to a UE and an MME. Initially, the UE is in the EMM-DEREGISTERED state, and in order to access a network, the UE performs a process of registering the corresponding network through an initial attach procedure. When the attach procedure is successfully performed, the UE and the MME are in the EMM-REGISTERED state.

In order to manage a signaling connection between the UE and the EPC, two states of ECM (EPS Connection Management)-IDLE and an ECM-CONNECTED state are defined, and these two states are applied to the UE and the MME. When the UE in the ECM-IDLE state establishes an RRC connection with the E-UTRAN, the corresponding UE is in the ECM-CONNECTED state. When the MME in the ECM-IDLE state establishes an S1 connection with the E-UTRAN, the MME is in an ECM-CONNECTED state. When the UE is in the ECM-IDLE state, the E-UTRAN does not have information regarding context of the UE. Thus, the UE in the ECM-IDLE state performs a UE-based mobility related procedure such as cell selection or cell reselection without receiving a command of the network. Meanwhile, when the UE is in the ECM-CONNECTED state, mobility of the UE is managed by a command of the network. In the ECM-IDLE state, when a location of the UE is changed to be different from that known by the network, the UE informs the network about its location through a tracking area updating procedure.

Figure 4:
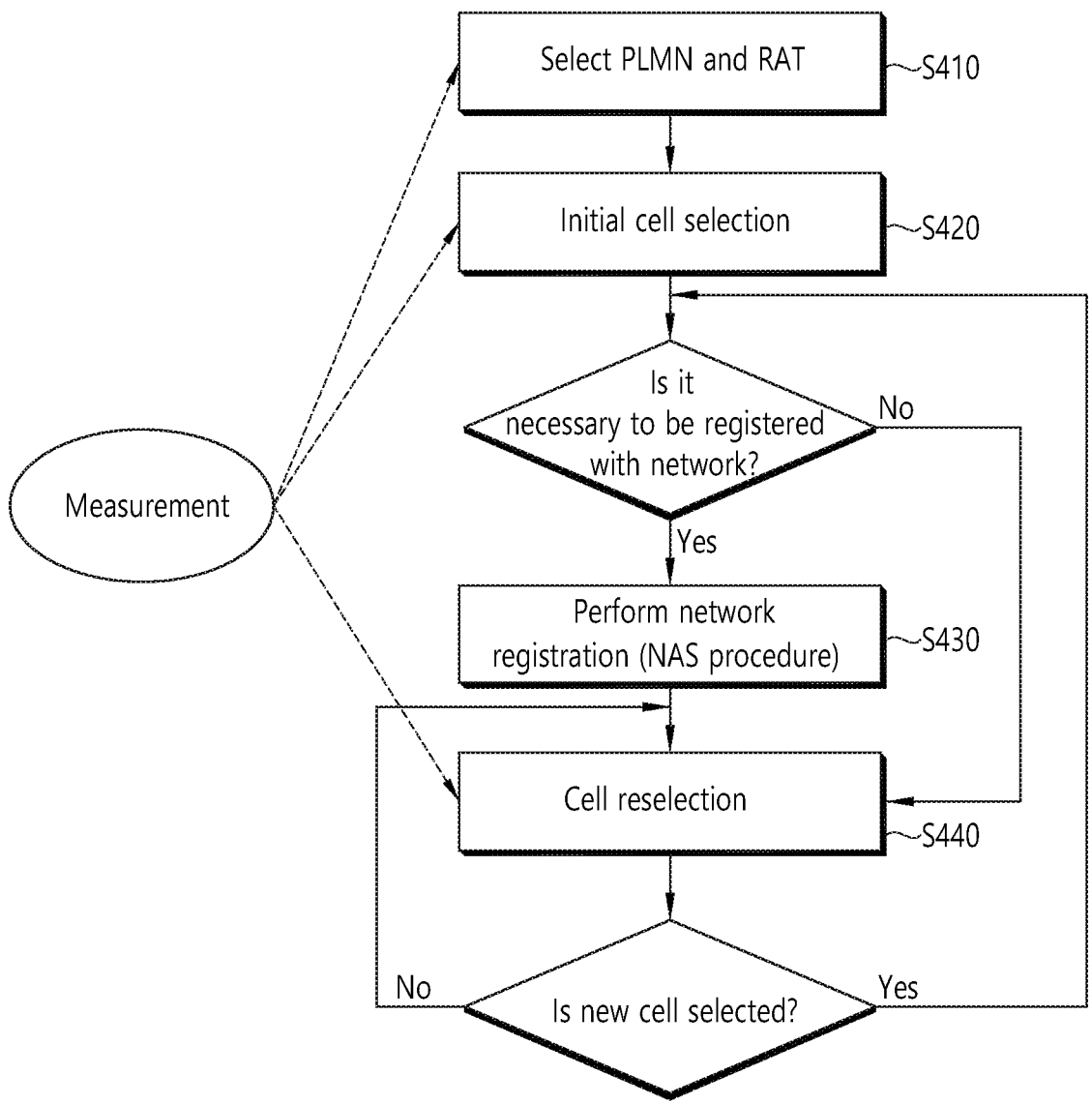
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
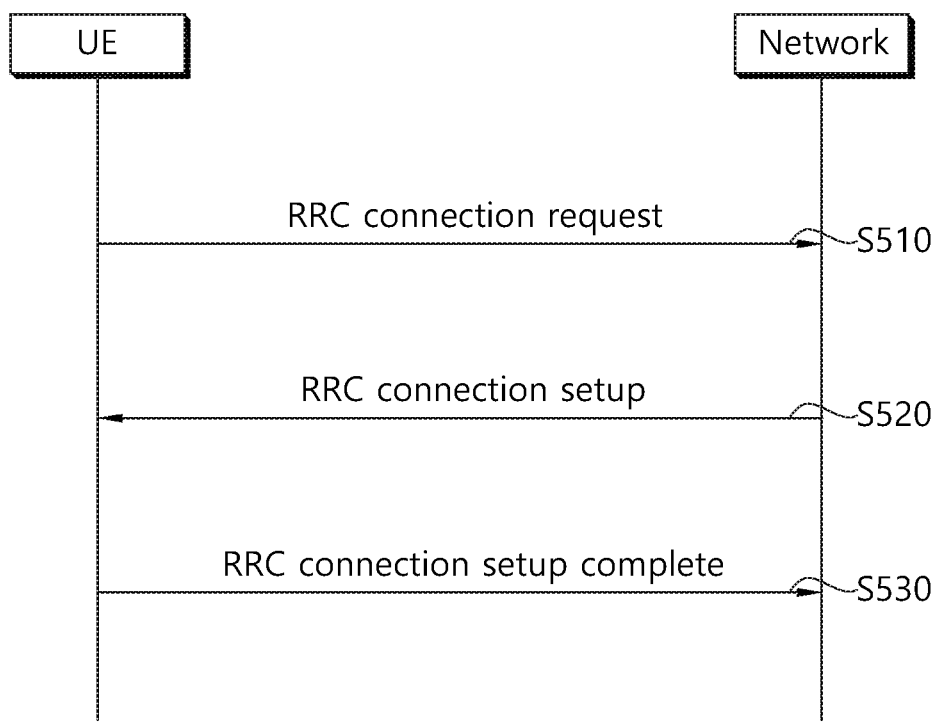
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
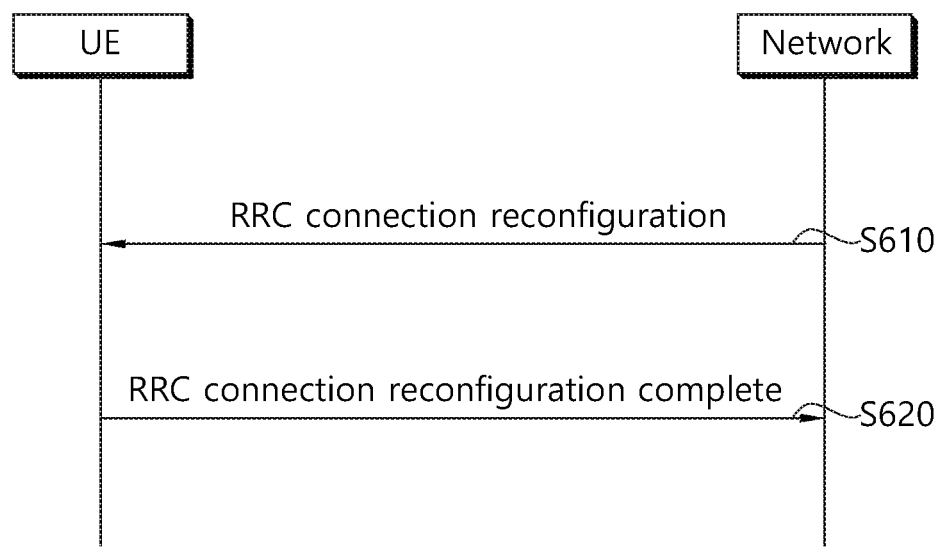
FIG. 6 shows an RRC connection reconfiguration procedure.

FIG. 6 shows an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

Hereinafter, a method and a procedure of selecting a cell by a terminal in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S = Q_{meas,s} + Q_{hyst}, \quad R_n = Q_{meas,n} - Q_{offset} \qquad \text{[Equation 1]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Figure 7:
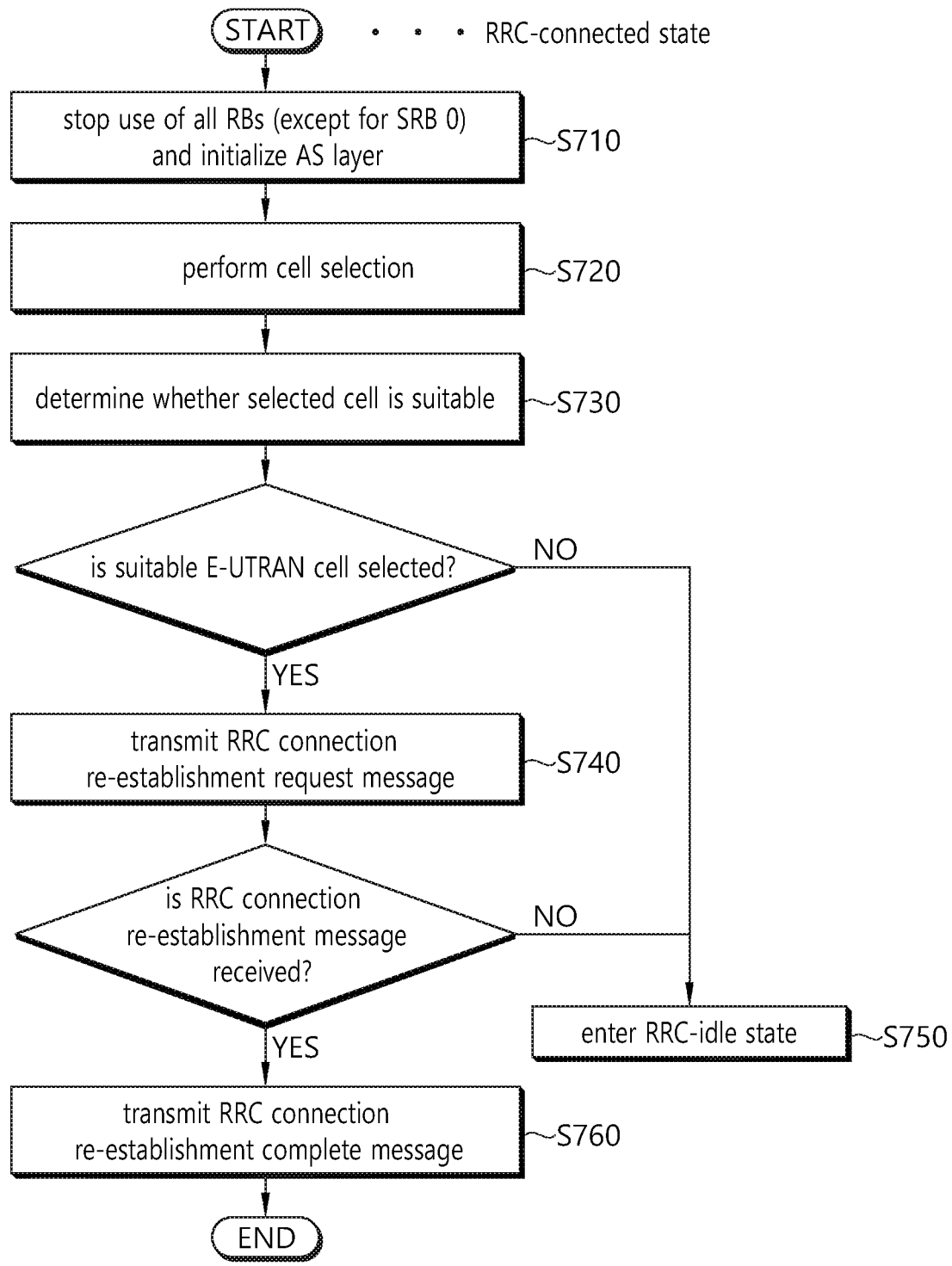
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
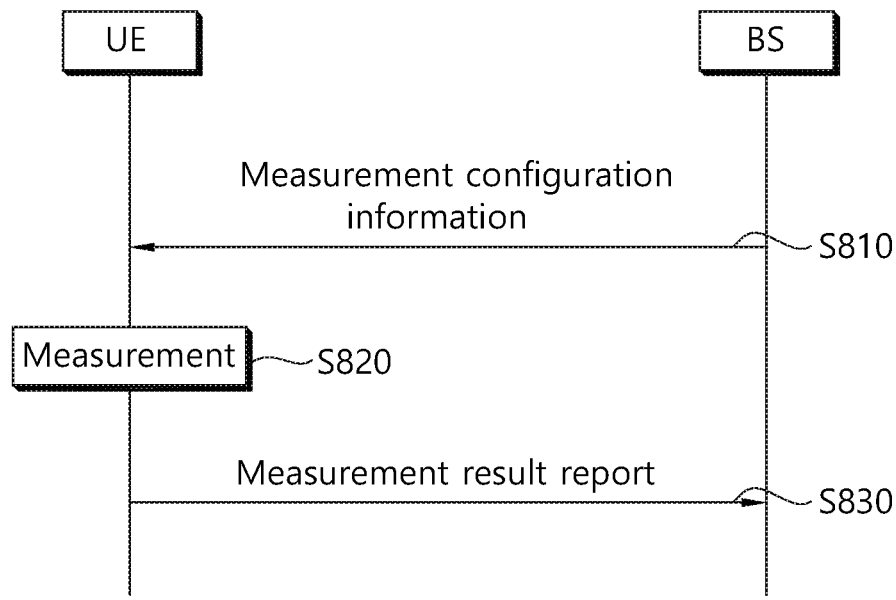
FIG. 8 shows a conventional method of performing measurement.

FIG. 8 shows a conventional method of performing measurement.

A UE receives measurement configuration information from a BS (S810). A message including the measurement configuration information is referred to as a measurement configuration message. The UE performs measurement based on the measurement configuration information (S820). If a measurement result satisfies a reporting condition included in the measurement configuration information, the UE reports the measurement result to the BS (S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

Figure 9:
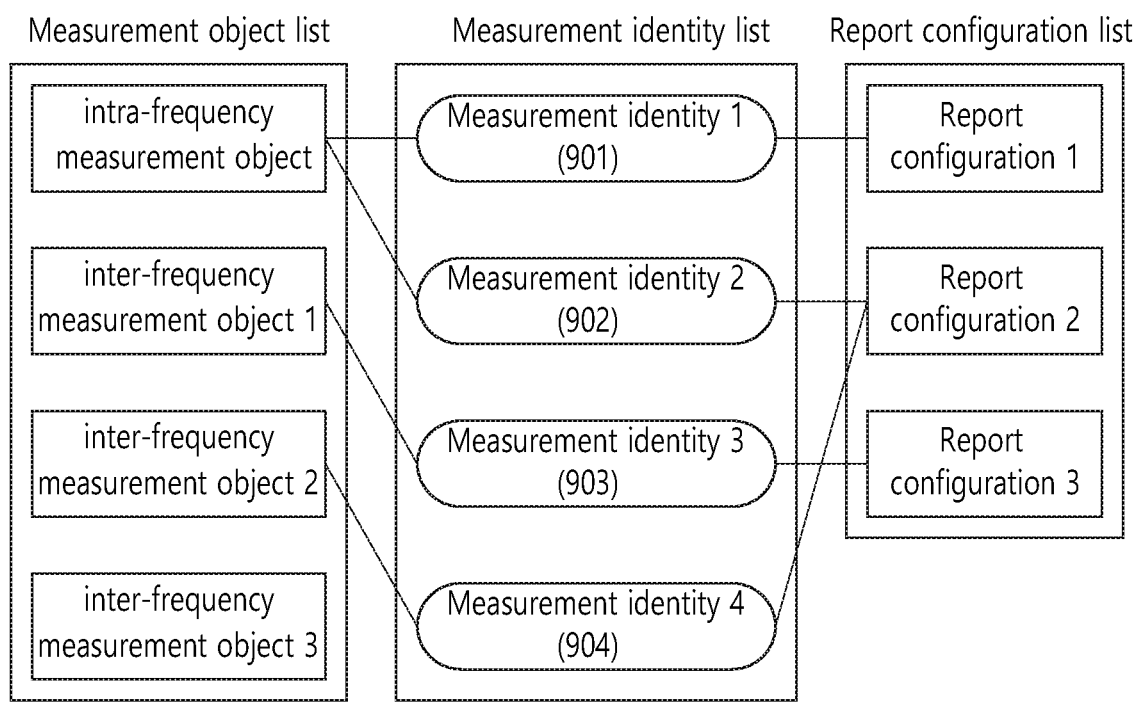
FIG. 9 shows an example of a measurement configuration assigned to a UE.

FIG. 9 shows an example of a measurement configuration assigned to a UE.

First, a measurement identity1 901 associates an intra-frequency measurement object with a reporting configuration 1. The UE performs intra-frequency measurement. The reporting configuration 1 is used to determine a reporting type and a criterion for reporting a measurement result.

A measurement identity2 902 is associated with the intra-frequency measurement object similarly to the measurement identifier1 901, and associates the intra-frequency measurement object with a reporting configuration 2. The UE performs intra-frequency measurement. The reporting configuration 2 is used to determine a reporting format and a criterion for reporting a measurement result.

By using the measurement identity1 901 and the measurement identity2 902, the UE transmits a measurement result even if the measurement result on the intra-frequency measurement object satisfies any one of the reporting configuration 1 and the reporting configuration 2.

A measurement identity3 903 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 904 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 10:
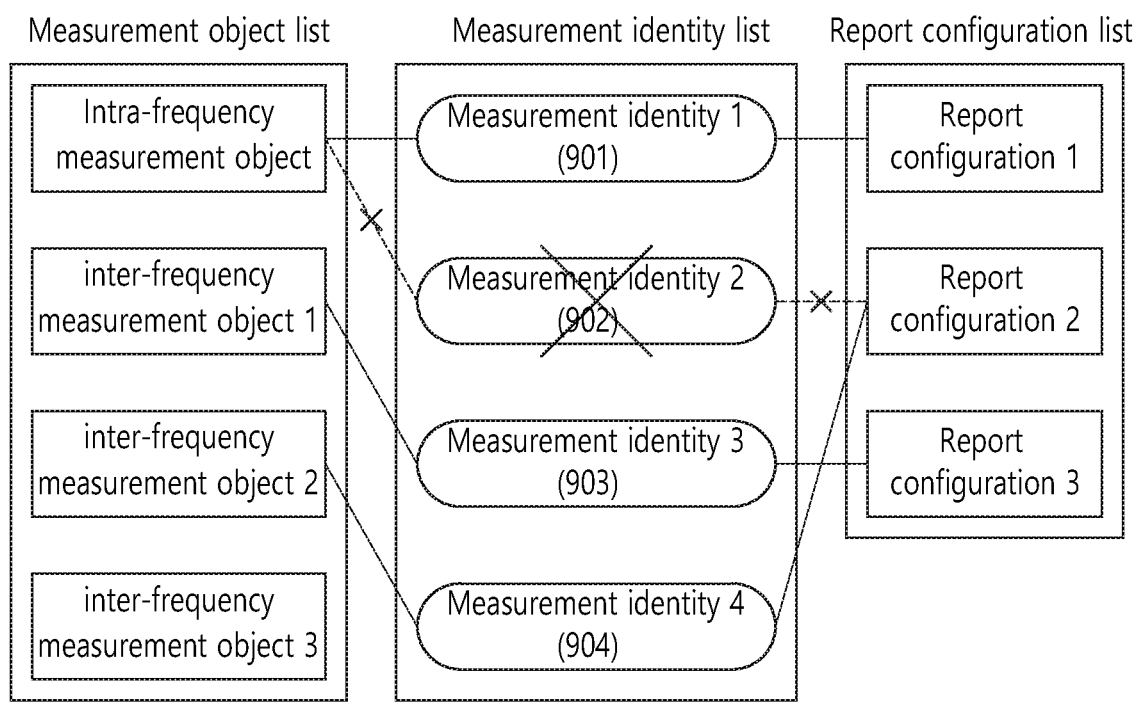
FIG. 10 shows an example of deleting a measurement identity.

FIG. 10 shows an example of deleting a measurement identity. When the measurement identity 2 902 is deleted, measurement for a measurement object associated with the measurement identity 2 902 is stopped and a measurement report is not transported. A measurement object or a reporting configuration associated with the deleted measurement identity may not be changed.

Figure 11:
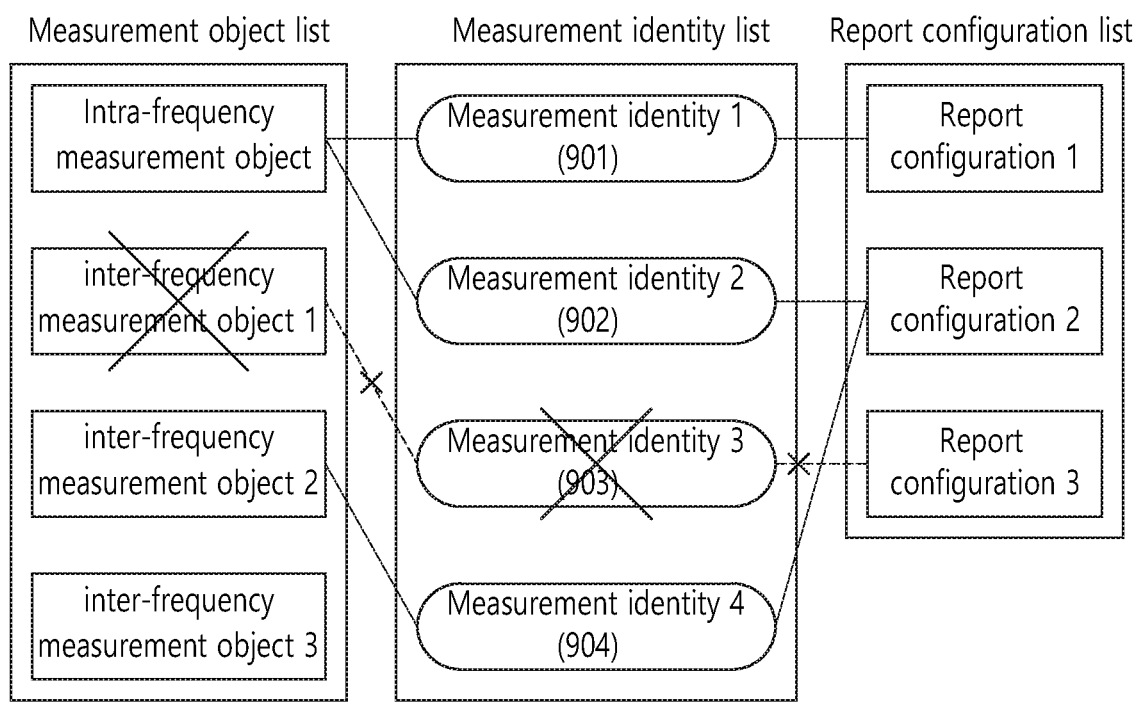
FIG. 11 shows an example of deleting the measurement object.

FIG. 11 shows an example of deleting the measurement object. When the inter-frequency measurement object 1 is deleted, the UE deletes even the measurement identity 3 903 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighbor cell. The measurement identity identifies a measurement object in which the measurement report is triggered. The measurement result of the neighbor cell may include a cell identity and a measurement quality of the neighbor cell. The measured quality may include at least one of reference signal received power (RSRP) and reference signal received quality (RSRQ).

Figure 12:
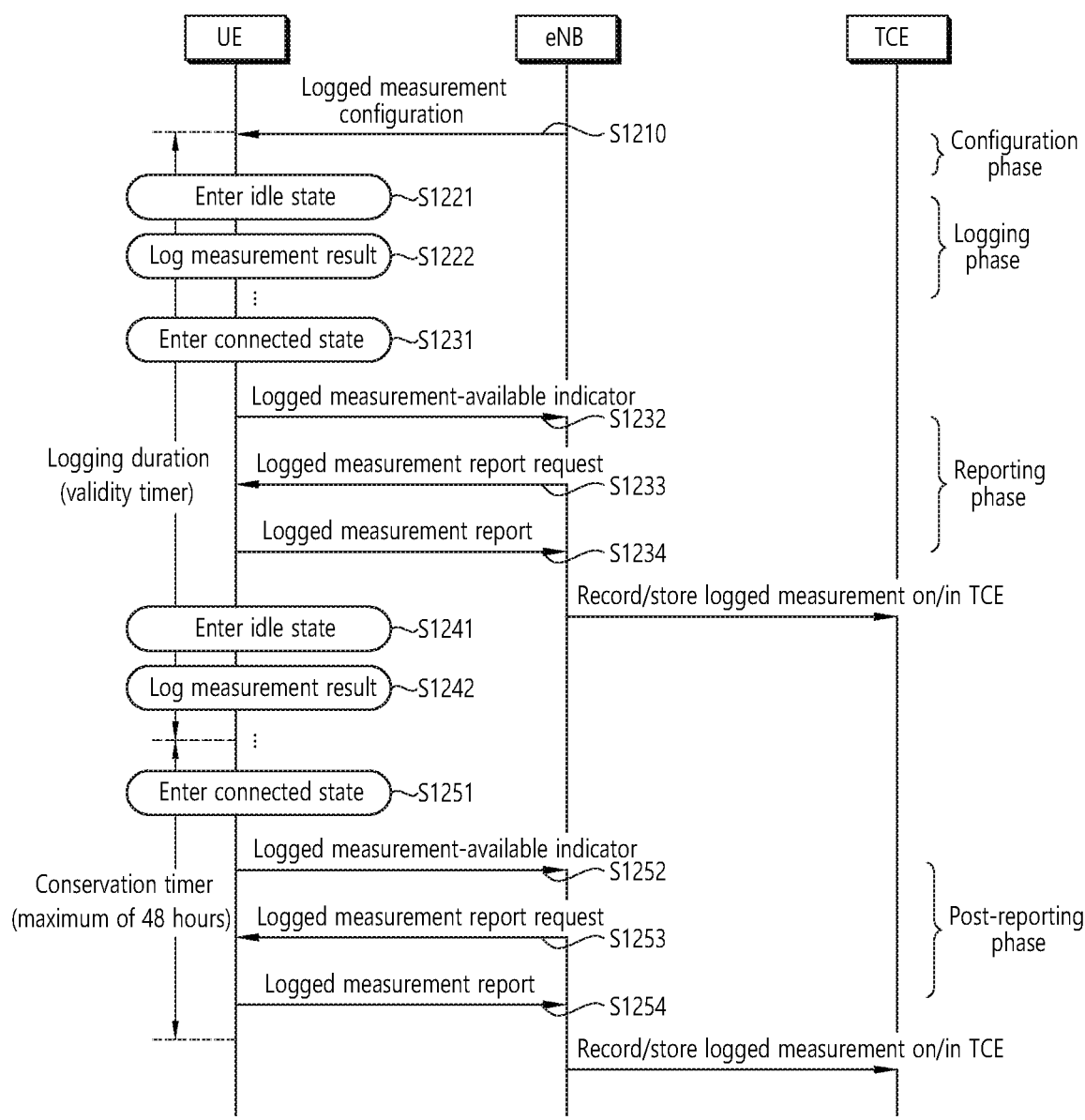
FIG. 12 shows a method of performing a logged MDT.

FIG. 12 shows a method of performing a logged MDT.

Referring to FIG. 12, the UE receives a logged measurement configuration (S1210). The logged measurement configuration may be included in an RRC message and transmitted through a downlink control channel. The logged measurement configuration may include at least one of a TCE ID, the information about the reference time that is a basis for logging, the logging duration, the logging interval, and the information about the area configuration. The logging interval indicates an interval at which the measurement result is stored. The logging duration indicates the duration time for which the UE performs the logged MDT. The reference time indicates a reference time for the duration time for which the logged MDT is performed. The area configuration indicates an area that is requested to be logged by the UE.

Meanwhile, the UE initiates a validity timer when a logged measurement configuration is received. The validity timer means the lifetime of the logged measurement configuration, which may be specified by the information about the logging duration. The duration time of the validity timer may indicate the validity of measurement results owned by UE as well as the valid lifetime of the logged measurement configuration.

A procedure that the UE performs the logged measurement configuration and the corresponding overall procedure is performed as described above is called a configuration phase.

When the UE enters the RRC idle state (S1221), the UE logs the measurement result while the validity timer is driven (S1222). The measurement result value may include RSRP, RSRQ, Received Signal Code Power (RSCP), Ec/No, and the like. The information that the measurement result is logged is called a logged measurement and/or a log of the measurement result. The time interval at which the UE logs the measurement result one or more times is called a logging phase.

What the UE executes the logged MDT based on the measurement configuration may vary depending on the location of the UE.

Figure 13:
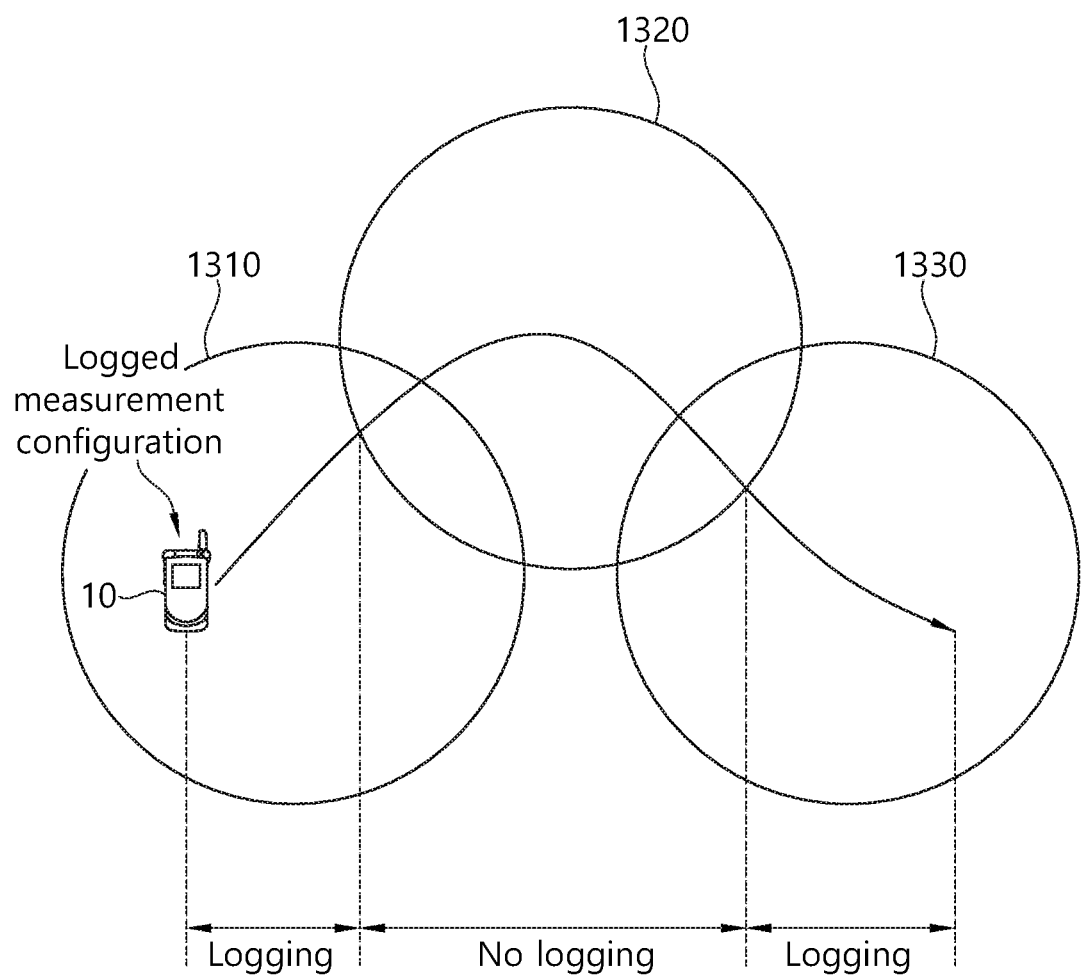
FIG. 13 shows an example of the logged MDT according to the logging area.

FIG. 13 shows an example of the logged MDT according to the logging area.

A network may configure the logging area that is the area in which the UE is to log. The logging area may be represented as a cell list or a tracking area/location area list. If a logging area is configured in the UE, the UE stops logging when the UE gets out of the logging area.

Referring to FIG. 13, a first area 1310 and a third area 1330 are areas configured as logging areas, and a second area 1320 is an area in which logging is not permitted. The UE performs logging in the first area 1310, but does not perform logging in the second area 1320. The UE performs logging again when the UE moves from the second area 1320 to the third area 1330.

Figure 14:
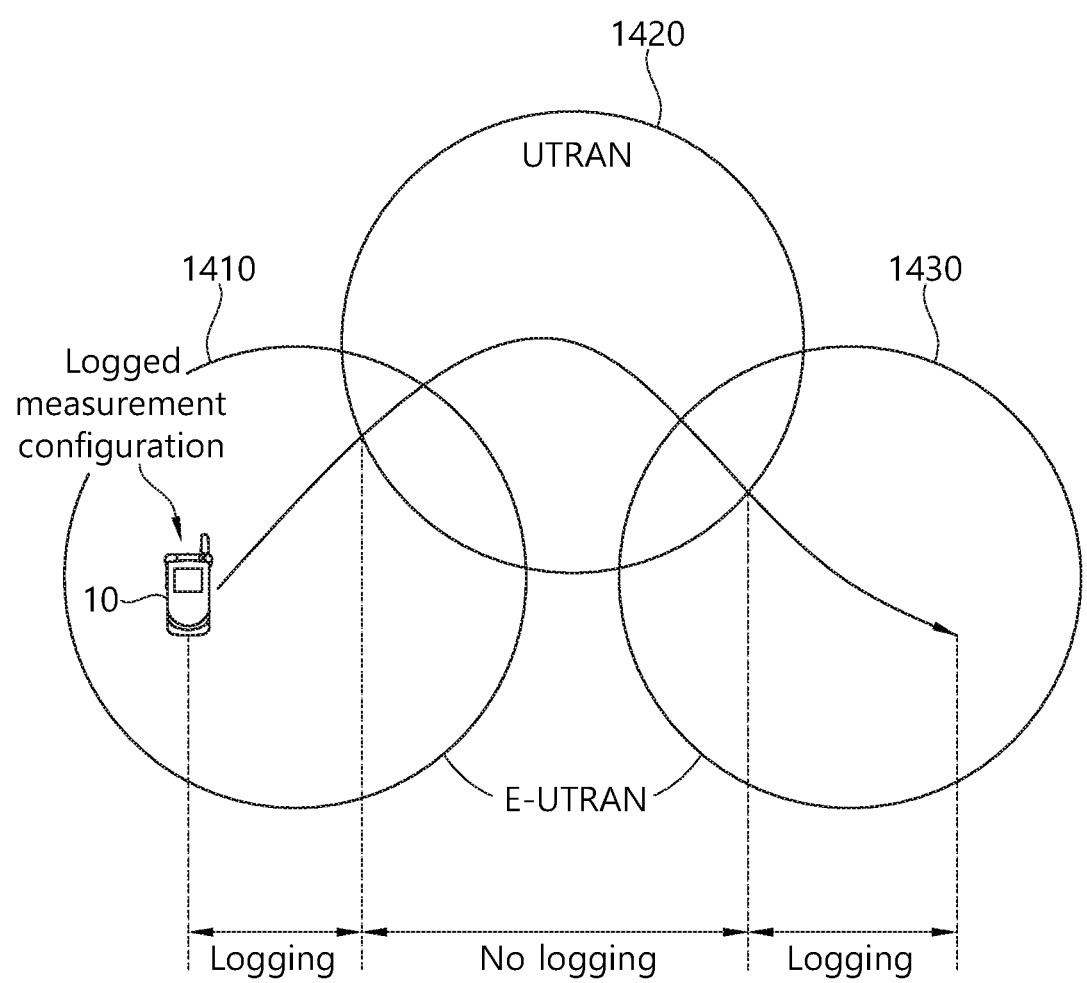
FIG. 14 shows an example of the logged MDT according to the change of the RAT.

FIG. 14 shows an example of the logged MDT according to the change of the RAT.

The UE performs logging only when the UE camps on the RAT from which the logged measurement configuration has been received and suspends logging in other RATs. However, the UE may the log cell information for other RATs in addition to camp-on RAT.

A first area 1410 and a third area 1430 are E-UTRAN areas, and a second area 1420 is a UTRAN area. The logged measurement configuration is received from the E-UTRAN. When the UE enters the second area 1420, the UE does not perform the MDT measurement.

Referring back to FIG. 12, the UE enters the RRC connected state (S1231). If there is a logged measurement to be reported, the UE informs an eNB that the logged measurement to be reported is present (S1232). The UE may inform the eNB that the logged measurement is present when an RRC connection is established, an RRC connection is reestablished, or an RRC connection is reconfigured. In addition, if the UE performs the handover, the UE may inform a handover target cell of the presence of the logged measurement. What the UE informs that the logged measurement s present to the eNB may be to transmit including a logged measurement-available indicator, that is, the indication information informing that the logged measurement is present, in an RRC message transmitted from the UE to the eNB. The RRC message may be an RRC connection configuration complete message, an RRC connection reestablishment complete message, an RRC reconfiguration complete message, or a handover complete message.

When the eNB receives a signal informing that the logged measurement is present from the UE, the eNB requests the UE to report the logged measurement (S1233). Requesting the report on the logged measurement may be to transmit including the logged measurement report request parameter regarding the information indicating the request in an RRC message. The RRC message may be the UE information request message.

When the UE receives the request to report the logged measurement from the eNB, the UE reports the logged measurement to the eNB (S1234). Reporting the logged measurement to the eNB may be to transmit including the logged measurement report including pieces of logged measurement in an RRC message to the eNB. The RRC message may be the UE information report message. In reporting the logged measurement, the UE may report all or some of logged measurement owned by the UE at the time of reporting to the eNB. If the UE reports some of logged measurements, the part of logged measurement reported may be discarded.

A phase of a process in which the UE informs the eNB that the logged measurement is present, receives a request to report from the eNB, and reports the logged measurement according to the request as described above is called a report phase.

What the UE measures while the logged MDT is performed is mainly about the wireless environment. The MDT measurement may include a cell identity and the signal quality and/or signal intensity of the cell. The MDT measurement may include the measurement time and place. The following table 2 exemplifies the contents logged by UE.

TABLE 2

| Parameter(set) | Description |
| --- | --- |
| Serving cell identity | Global Cell Identity of Serving cell |
| Measured results of serving cell | Measured RSRP of serving cell<br>Measured RSRQ of serving cell |
| Measured results of neighbor cell | Cell Identities of measured E-UTRA cells, Measured results of E-UTRA cells<br>Cell Identities of measured UTRA cells, Measured results of UTRA cells<br>Cell Identities of measured GERAN cells, Measured results of GERAN cells<br>Cell Identities of measured CDMA 2000 cells, Measured results of CDMA 2000 cells |
| Time stamp | The moment of logging measurement results, calculated as {current time minus absoluteTimeStamp} in seconds |
| Location information | Detailed location information at the moment of logging |

The information logged at different logging times can be saved to be classified as different log entries.

Figure 15:
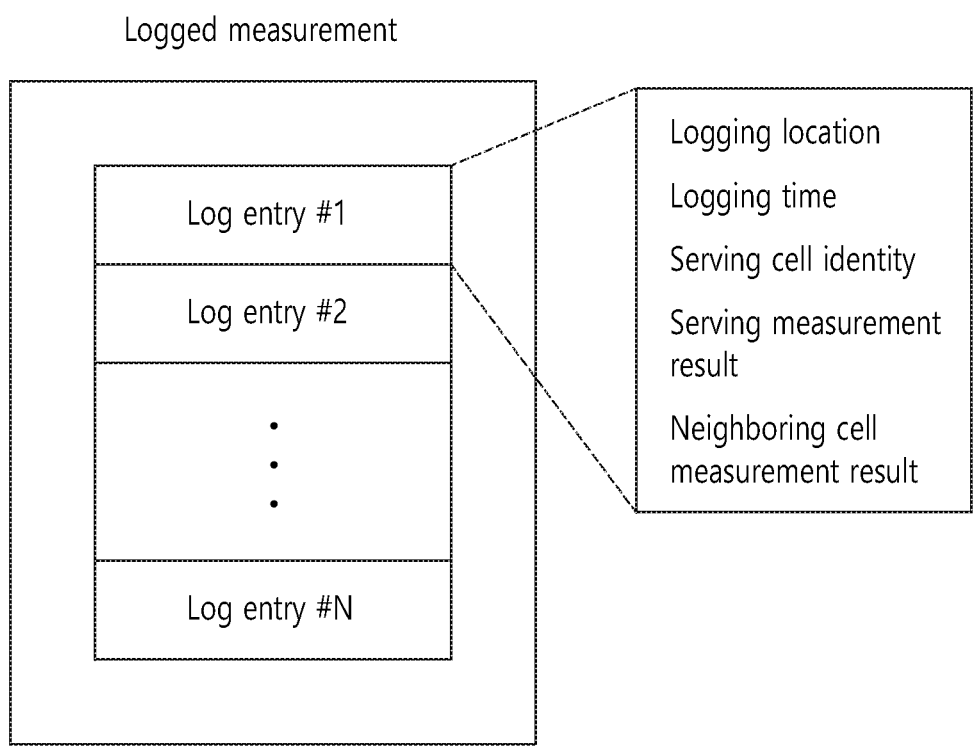
FIG. 15 shows an example of the logged measurement.

FIG. 15 shows an example of the logged measurement.

The logged measurement includes one or more log entries.

The log entry includes a logging location, a logging time, a serving cell identity, a serving cell measurement result, and a neighboring cell measurement result.

The logging location indicates the location where the UE performs measurement. The logging time indicates the time when the UE performs measurement. The information logged at different logging times is stored in different log entries.

The serving cell identity may include a cell identity in the layer 3, which is called a Global Cell Identity (GCI). The GCI is a set of a Physical Cell Identity (PCI) and a PLMN identity.

Meanwhile, the UE may perform logging by analyzing the criteria related to the performance of the UE in addition to the wireless environment. For example, the criteria related to the performance of UE may include a throughput, an erroneous transmission/reception rate, etc.

Referring back to FIG. 12, the aforementioned logging phase and report phase may be present in plural times for the logging duration (S1241 and S1242).

The eNB may record/store the logged measurement on/in a TCE when the logged measurement is reported.

If the UE has the logged measurement that has not been reported after the validity timer expires, that is, after the logging duration elapses, the UE performs a procedure for reporting the logged measurement to the eNB. A phase in which the overall procedure is performed for this is called a post-reporting phase.

When the logging duration expires, the UE discards the logged measurement configuration and initiates a conservation timer. After the logging duration is terminated, the UE stops the MDT measurement. However, the measurement logged already remains intact without being discarded. The conservation timer indicates the lifetime of the remaining logged measurement.

When the UE enters the RRC connected state (S1251) before the conservation timer expires, the UE may report the logged measurement which hasn't been reported to the eNB. In this case, the procedure for the logged measurement report aforementioned may be performed (S1252, S1253 and S1254). When the conservation timer expires, the remaining logged measurement may be discarded. When the logged measurement is reported, the eNB may record/store the logged measurement on/in the TCE.

The conservation timer may be fixed to a predetermined value in the UE and may be previously set in the UE. For example, the value of the conservation timer may be 48 hours. Or, the value of the conservation timer may be included in the logged measurement configuration and transferred to the UE or may be included in a different RRC message and transferred to the UE.

Meanwhile, when a new logged measurement configuration is transferred to the UE, the UE may update the existing logged measurement configuration into the newly obtained logged measurement configuration. In this case, the validity timer can be started again from the time when the logged measurement configuration is newly received. In addition, the logged measurement based on the previous logged measurement configuration may be discarded.

Figure 16:
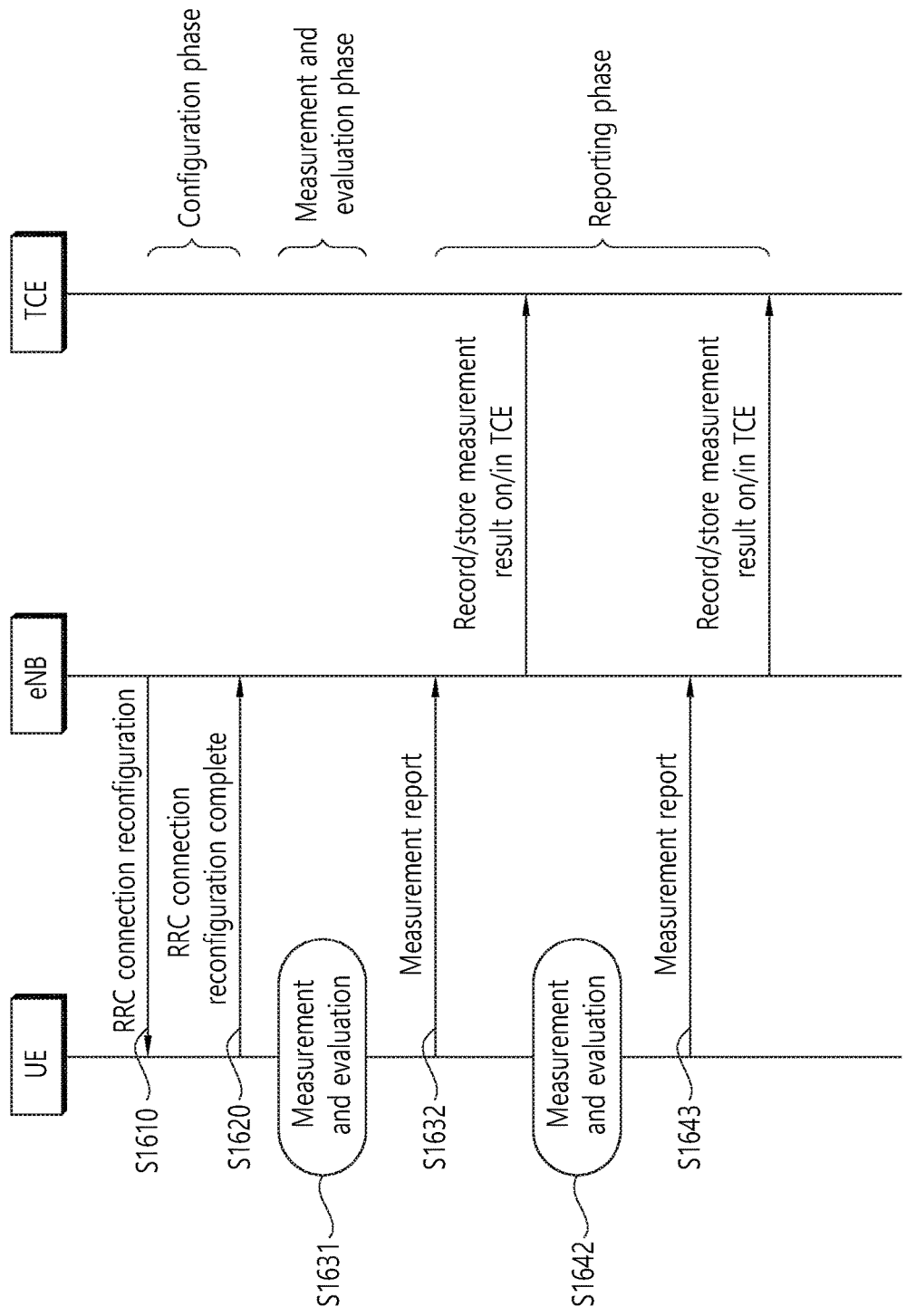
FIG. 16 shows an example of an immediate MDT.

FIG. 16 shows an example of an immediate MDT. The immediate MDT is based on a radio resource management (RRM) measurement and the report mechanism. In addition, the information related to the location upon the measurement report is added and reported to the eNB.

Referring to FIG. 16, the UE receives an RRC connection reconfiguration message (S1610) and transmits an RRC connection reconfiguration complete message (S1620). Through this, the UE enters the RRC connected state. The UE may receive the measurement configuration by receiving the RRC connection reconfiguration message. In the example of FIG. 16, the measurement configuration has been illustrated as being received through the RRC connection reconfiguration message, but the measurement configuration may be included in a different RRC message and transmitted.

The UE performs measurement and evaluation in the RRC connected state (S1631) and reports the measurement result to the eNB (S1632). In the immediate MDT, the measurement result may provide the precise location information, as possible, as in the example of the location information provided by the Global Navigation Satellite System (GNSS). For the location measurement, such as an RF fingerprint, the measurement result may provide the measurement information about a neighboring cell, which may be used to determine the location of the UE.

From FIG. 16, it may be seen that even after the executed measurement and evaluation (S1631) and the report (S1632), the UE reports the measurement result (S1643) to the eNB right after performing measurement and evaluation (S1642). This is the biggest difference between the logged MDT and the immediate MDT.

Hereinafter, machine-type communication (MTC) will be described.

Figure 17:
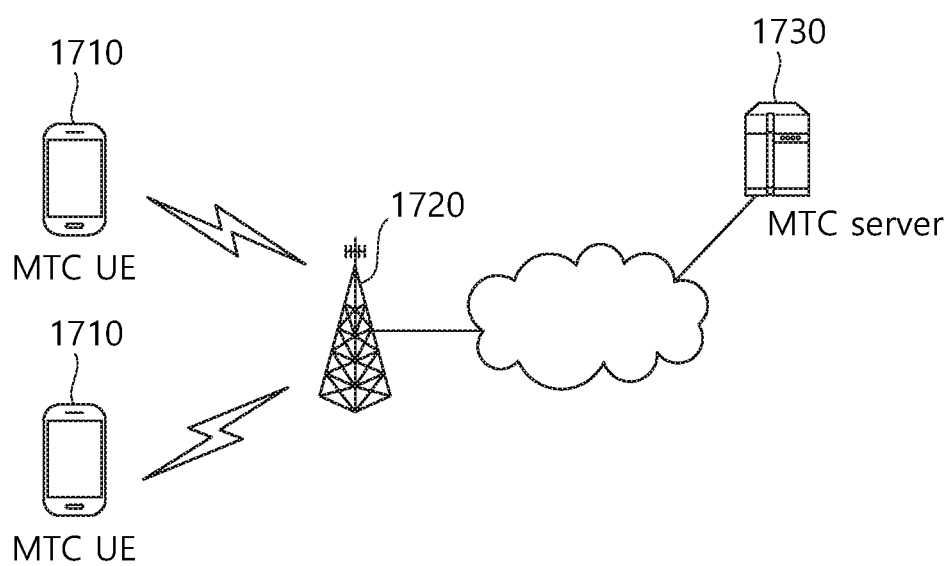
FIG. 17 illustrates an example of MTC.

FIG. 17 illustrates an example of MTC.

MTC refers to information exchange between MTC UEs 1710 via a BS 1720 without involving human interactions or information exchanges between an MTC UE 1710 and an MTC server 1730 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, and a UE Category 0 UE may be used with the same meaning, and a normal UE may be used to refer to a UE other than the listed UEs.

The MTC server 1730 is an entity communicating with the MTC UE 1710. The MTC server 1730 runs an MTC application and provides an MTC-specific service to an MTC device. The MTC UE 1710 is a wireless device that provides MTC communication and may be fixed or mobile.

Since an MTC UE has a small amount of data to transmit and is occasionally involved in uplink/downlink data transmission/reception, it is effective to reduce the cost of the UE and to decrease battery consumption thereof according to a low data transmission rate. The MTC UE is characterized by low mobility and thus has a hardly changing channel environment.

The MTC UE does not require a high-performance function and generally uses a small amount of data. The concept of UE Category 0 is introduced in order to manufacture a low-cost MTC UE. A UE category is a general number used in the 3GPP to indicate how much data a UE can process in a communication modem. Table 3 shows 3GPP UE categories.

TABLE 3

| UE Category | DL speed | UL speed |
| --- | --- | --- |
| 0 | 1 Mbps | 1 Mbps |
| 1 | 10 Mbps | 5 Mbps |
| 2 | 50 Mbps | 25 Mbps |
| 3 | 100 Mbps | 50 Mbps |
| 4 | 150 Mbps | 50 Mbps |
| 5 | 300 Mbps | 75 Mbps |
| 6 | 300 Mbps | 50 Mbps |
| 7 | 300 Mbps | 100 Mbps |
| 8 | 3 Gbps | 1.5 Gbps |
| 9 | 450 Mbps | 50 Mbps |
| 10 | 450 Mbps | 100 Mbps |
| 11 | 600 Mbps | 50 Mbps |
| 12 | 600 Mbps | 100 Mbps |
| 13 | 400 Mbps | 50 Mbps |

A UE Category 0 UE is allowed to process only 1 Mbps, making it possible to manufacture a modem without much effort and high costs, and may use only one antenna. Also, the UE Category 0 UE is allowed to perform transmission or reception only in a specified time, rather than simultaneously performing transmission and reception, and thus may operate in FDD in the same manner as in TDD. In addition, unlike in existing TDD, a sufficient switching time of about 1 ms may be assigned for a period of transition between transmission and reception, thereby remarkably reducing costs for hardware components, particularly in view of a modem and RF, overall.

MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

Figure 18:
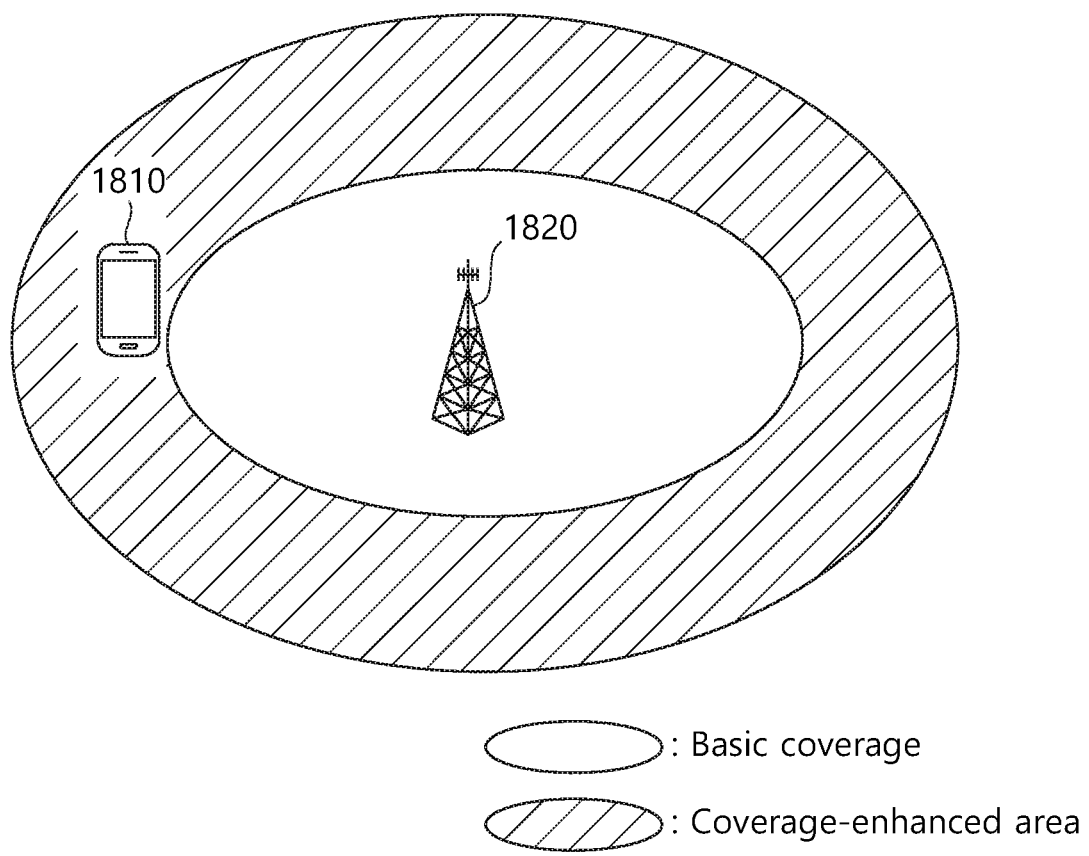
FIG. 18 illustrates an example of cell coverage enhancement for an MTC device.

FIG. 18 illustrates an example of cell coverage enhancement for an MTC device.

As described above, various coverage enhancement techniques, such as a repetitive transmission method for an MTC UE by each channel/signal, have recently been under discussion. However, in a case of an MTC UE 1810 located in a coverage enhancement area in FIG. 18, that is, an MTC UE existing in an area requiring coverage enhancement, the accuracy of an RSRP/RSRQ measurement may significantly deteriorate as compared with a normal UE. Therefore, in order to increase the accuracy of measurement, the UE may need to extend a measurement period. In a case of measurement/logging performed during the RRC_IDLE mode, a network may not identify whether the measurement is performed in an extended period, which may lead to a misinterpretation of a reported result. The present invention provides a solution to address this problem.

Hereinafter, a method in which an MTC UE located in a coverage enhancement area measures a cell and reports a measurement according to the present invention will be described.

The present invention proposes a method for enabling a network to know whether a UE performs measurement in a coverage enhancement mode (hereinafter, referred to as a CE mode) or in a normal mode. To this end, the present invention provides a method in which a UE receives a measurement configuration associated with the CE mode (step 1), performs measurement corresponding to the measurement configuration (step 2), and reports not only a measurement result but also measurement state information (step 3) upon receiving a request to report the measurement result from the network. However, the measurement result may be reported without the measurement configuration (for example, a logged RLF report).

In the present invention, it is assumed that a coverage enhancement level may include a plurality of levels including a non-coverage enhancement level, and a UE requiring measurement may perform measurement according to a coverage enhancement level. Depending on a coverage enhancement level, the number of samples for RSRP/RSRQ measurement may vary and measurement periodicity for measurement may vary. Hereinafter, an operation of the UE in the three steps will be described in detail according to an embodiment of the present invention.

First, the UE receives a measurement configuration associated with the CE mode from the network. The measurement configuration include a coverage enhancement level required for the UE to measure a cell/PLMN belonging to a serving cell/neighboring cell/tracking area, measurement periodicity required for the UE to measure a cell/frequency/tracking area/PLMN, the number of RSRP/RSRQs required for the UE to measure a cell/frequency/tracking area/PLMN, whether the UE reports measurement state information to the network, whether the UE reports not only a measurement result performed at each coverage enhancement level but also a measurement result performed at a non-coverage enhancement level if available, a measurement offset for a cell/frequency corresponding to a coverage enhancement level, information on a measurement target (that is, an intra LTE cell or an inter-RAT cell), and the like. The measurement configuration may be provided via dedicated/broadcast signaling.

Figure 19:
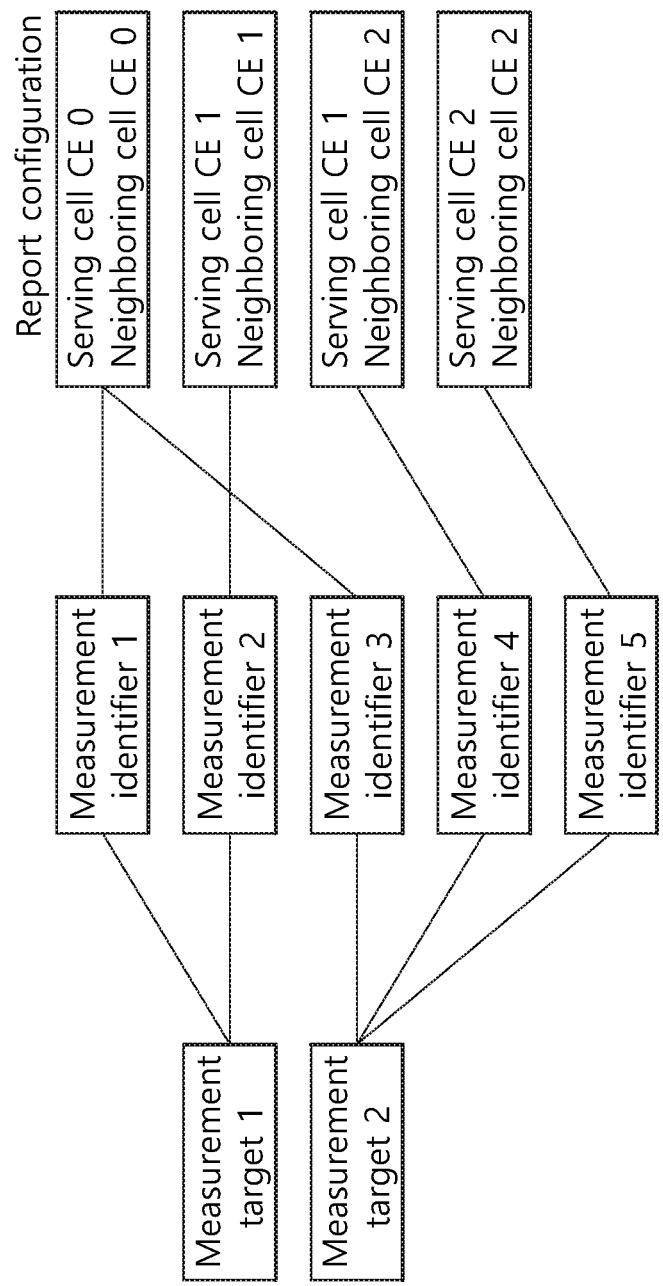
FIG. 19 shows an example of applying different CE levels to a plurality of cells.

Regarding the coverage enhancement level required for measurement, the coverage enhancement level required for measurement may vary depending on a serving cell (or frequency) and a neighboring cell (or frequency). For example, while the neighboring cell may be measured at coverage enhancement level 2, the serving cell may be measured at coverage enhancement level 1. FIG. 19 shows an example of a measurement configuration for the RRC connected mode. In FIG. 19, a neighboring cell corresponds to a neighboring cell connected to an object to be measured.

Instead of setting an explicit coverage enhancement level for measurement, one or more RSRP/RSRQ threshold levels may be set for the UE in order to determine a coverage enhancement level for measurement. For example, the network may signal a zeroth RSRP/RSRQ threshold in level 0, a first RSRP/RSRQ threshold in level 1, a second RSRP/RSRQ threshold in level 2, and a third RSRP/RSRQ threshold in level 3. Level 0 means no coverage enhancement for measurement. After receiving the thresholds for the levels from the network, while performing measurement, the UE determines a coverage enhancement level for measurement. First, the UE performs measurement at level 0. When a measurement result at level 0 is higher than the zeroth RSRP/RSRQ threshold, the UE performs no further measurement. When the measurement result at level 0 is lower than the zeroth RSRP/RSRQ threshold and is higher than the first RSRP/RSRQ threshold, the UE performs measurement at level 1. When a measurement result at level 1 is lower than the first RSRP/RSRQ threshold and is higher than the second RSRP/RSRQ threshold, the UE performs measurement at level 2. When a measurement result at level 2 is lower than the second RSRP/RSRQ threshold and is higher than the third RSRP/RSRQ threshold, the UE performs measurement at level 3. Although it is assumed in the embodiment of the present invention that the CE level may be set to from 0 to 3, the present invention is not limited thereto. Instead, it is to be noted that one or more levels may be set.

Instead of setting an explicit coverage enhancement level for measurement, the UE may set a plurality of levels based on the number of repetitions (subframes or resource blocks) needed for successful downlink reception/uplink transmission of a specific message or a specific channel including a physical channel in order to determine a coverage enhancement level for measurement. For example, the network may signal a zeroth repetition threshold in level 0, a first repetition threshold in level 1, a second repetition threshold in level 2, and a third repetition threshold in level 3. Level 0 means no coverage enhancement for measurement. After receiving the thresholds for the levels from the network, while performing measurement, the UE determines a coverage enhancement level for measurement. First, the UE performs measurement at level 0. When the number of repetitions needed at level 0 is lower than the zeroth repetition threshold, the UE performs measurement at level 0. When the number of repetitions needed is higher than the zeroth repetition threshold and is lower than the first repetition threshold, the UE performs measurement at level 1. When the number of repetitions needed is higher than the first repetition threshold and is lower than the second repetition threshold, the UE performs measurement at level 2. When the number of repetitions needed is higher than the second repetition threshold and is lower than the third repetition threshold, the UE performs measurement at level 3. Although it is assumed in the embodiment of the present invention that the CE level may be set to from 0 to 3, the present invention is not limited thereto. Instead, it is to be noted that one or more levels may be set.

Regarding the measurement periodicity required for measurement, the measurement periodicity required for the UE for measurement may vary depending on each configured cell/frequency/tracking area/PLMN corresponding to the coverage enhancement level for measurement. As shown in FIG. 19, when a serving cell (or frequency) and a neighboring cell (or frequency) are configured with different coverage enhancement levels for measurement, measurement periodicities for the cells (or frequencies) may be different.

Regarding the number of RSRP/RSRQs required for measurement, RSRP/RSRQ samples required for the UE for measurement may differ depending on each configured cell/frequency/tracking area/PLMN corresponding to the coverage enhancement level for measurement. As shown in FIG. 19, when a serving cell (or frequency) and a neighboring cell (or frequency) are configured with different coverage enhancement levels for measurement, the numbers of RSRP/RSRQ measurement samples for the cells (or frequencies) may be different.

Second, the UE performs measurement corresponding to the measurement configuration. The measurement may be performed in the RRC_IDLE mode and/or the RRC_CONNECTED mode. The UE may perform measurements corresponding to one or more coverage enhancement levels.

The network may support coverage enhancement. That is, the network may transmit the same message or signal to the UE a plurality of times so that the UE accurately receives a downlink message/signal, and may combine the same message/signal a plurality of times in order to successfully receive an uplink message/signal received from the UE.

The UE may identify whether the network supports coverage enhancement. The UE may identify a supported coverage enhancement level by at least one of reception of an MIB repeated a plurality of times as compared with repetitions in subframe #0 of all radio frames, reception of an SIB including information on a coverage enhancement operation, such as random access resource information (preamble, timing, frequency, and repetition numbers), repetition of a new SIB created for coverage enhancement, repetition of an indicator indicating whether a cell supports coverage enhancement (this indicator may be included in a broadcast message/signal), and repetition of a coverage enhancement level.

A measurement target may be included in a cell/frequency/tracking area/PLMN list of the measurement configuration, and the network may configure the UE to perform measurement in the CE mode (coverage enhancement level).

Third, upon receiving a request to report a measurement result from the network, the UE reports not only a measurement result but also measurement state information to the network. The measurement state information may include one or more of the following information.

(1) Measurement mode indication information: Information indicating whether measurement is performed in the CE mode or in the normal mode. Normal-mode measurement indicates that the UE measures the quality of a radio channel (for example, RSRP/RSRQ) in a state where no CE is needed. CE-mode measurement may indicate, as compared with normal-mode measurement, that the UE measures and averages RSRP/RSRQ for an extended period in a physical layer or a protocol layer. Thus, CE-mode measurement enables the UE to calculate a measurement result based on a greater number of measurement samples in the physical layer or the protocol layer. Alternatively, CE-mode measurement may indicate, as compared with normal-mode measurement, that a greater number of measurement RSSI/RSRP/RSRQ samples are used for measurement in the physical layer or the protocol layer within a given time. The CE mode may be defined as a plurality of CE modes, and time to measure RSRP/RSRQ or the number of samples measured for a given time may vary depending on each CE mode.

(2) Indication information indicating that the accuracy of a result measured in the CE mode may be lower than the accuracy of a result measured in the normal mode. In addition, reasons for low accuracy may be included. For example, this information may indicate that the accuracy of a measurement result is low due to an operation in the CE mode.

(3) Number of uplink/downlink transmission/reception repetition: Information indicating repetition numbers for successful downlink reception and/or successful uplink transmission. For a downlink, the number may indicate the number of repetitions required for successful reception of a particular message, such as an MIB, SIB, or physical channel (for example, PDCCH). For an uplink, a message size may also be included.

(4) Period information: Information indicating a measurement period for one measurement entry in a measurement report.

(5) Information indicating whether measurement is based on CSI-RS-based DRS measurement: The UE may report a result including a measurement result obtained in the CE mode and/or a result obtained in the normal mode with respect to the same measurement target. The measurement target may include an intra-LTE cell (including a serving cell and a neighboring cell) or an inter-RAT cell. That is, the UE may report only the measurement result obtained in the CE mode, may report only the measurement result obtained in the normal mode, and may report both the measurement result obtained in the CE mode and the measurement result obtained in the normal mode. When the measurement results received from the UE includes a measurement result obtained in the normal mode among even though RSRP/RSRQ is lower than a predefined threshold, the network may exclude the measurement result.

The measurement state information may be reported to the network when radio link failure (RLF) information is reported. The measurement state information may be reported to the network when handover failure (HOF) information is reported. The measurement state information may be reported to the network when a logged measurement result is reported. The measurement state information may be reported to the network when a measurement result on an MBSFN area is reported. The measurement state information may be reported to the network when a certain measurement result (including a measurement result obtained in the RRC_IDLE mode) is reported.

Figure 20:
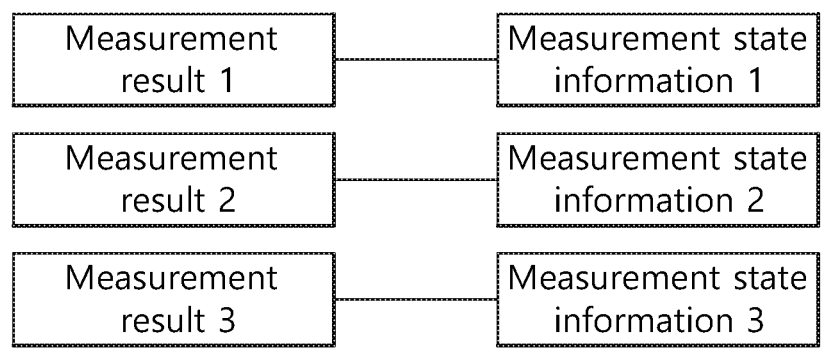
FIG. 20 illustrates measurement state information corresponding to a plurality of measurement results.

FIG. 20 illustrates measurement state information corresponding to a plurality of measurement results.

Referring to FIG. 20, when a plurality of measurement results is obtained in the CE mode, related measurement state information corresponding to the measurement results is included each entry of the measurement results. When there are three entries in a measurement result, corresponding measurement state information is also reported with respect to each entry. Alternatively, one piece of measurement state information may be mapped to a plurality of measurement result entries for signaling optimization.

In the present invention, when a measured/logged MDT/MBSFN MDT is configured, a network may control whether to allow the UE to perform measurement in the CE mode and to report a measurement result. To this end, the network may additionally provide an RSRP/RSRQ threshold to trigger measurements in the CE mode. After receiving the threshold, when RSRP and/or RSRQ values measured by the UE are the threshold or lower, the UE may perform measurement in the CE mode. When a plurality of CE modes is defined, the network may provide a plurality of RSRP/

RSRQ thresholds. After receiving the thresholds, when RSRP and/or RSRQ values measured by the UE are the corresponding thresholds or lower, the UE may perform measurement using a CE mode corresponding to the measured value. Alternatively, the UE may perform measurement in the CE mode only when requiring multiple receptions and combinations to receive a downlink message. When a plurality of CE modes is defined, the network may provide a threshold as to the number of downlink messages required by the UE for successful downlink reception, and the UE may determine a corresponding CE mode according to the number of downlink messages required and may perform measurement using a parameter (for example, measurement time and the number of samples) corresponding to the mode. In addition, when information on a period in which measurement is performed in the CE mode is received from the network, the UE may perform measurement for one measurement result during an indicated period. In addition, when the UE receives information on an area (cells, tracking areas, and PLMNs) in which CE-mode measurement is allowed from the network, the UE may perform measurement using the CE mode only in a case of performing measurement in an indicated area. Furthermore, when a cell does not support CE, the UE may perform only normal-mode measurement in the cell, instead of performing CE-mode measurement. The UE may identify whether a cell supports CE through a particular message (for example, an MIB) broadcast from the cell. The message may include information on whether the cell supports the CE mode and on how often a particular message (for example, SIB1 defined for MTC) is repeated.

In the present invention, when a measured/logged MDT/MBSFN MDT is configured, the network may control whether to report measurement state information. Further, if possible, the network may also control whether to report not only a measurement result obtained in the CE mode but also a measurement result obtained in the normal mode.

Figure 21:
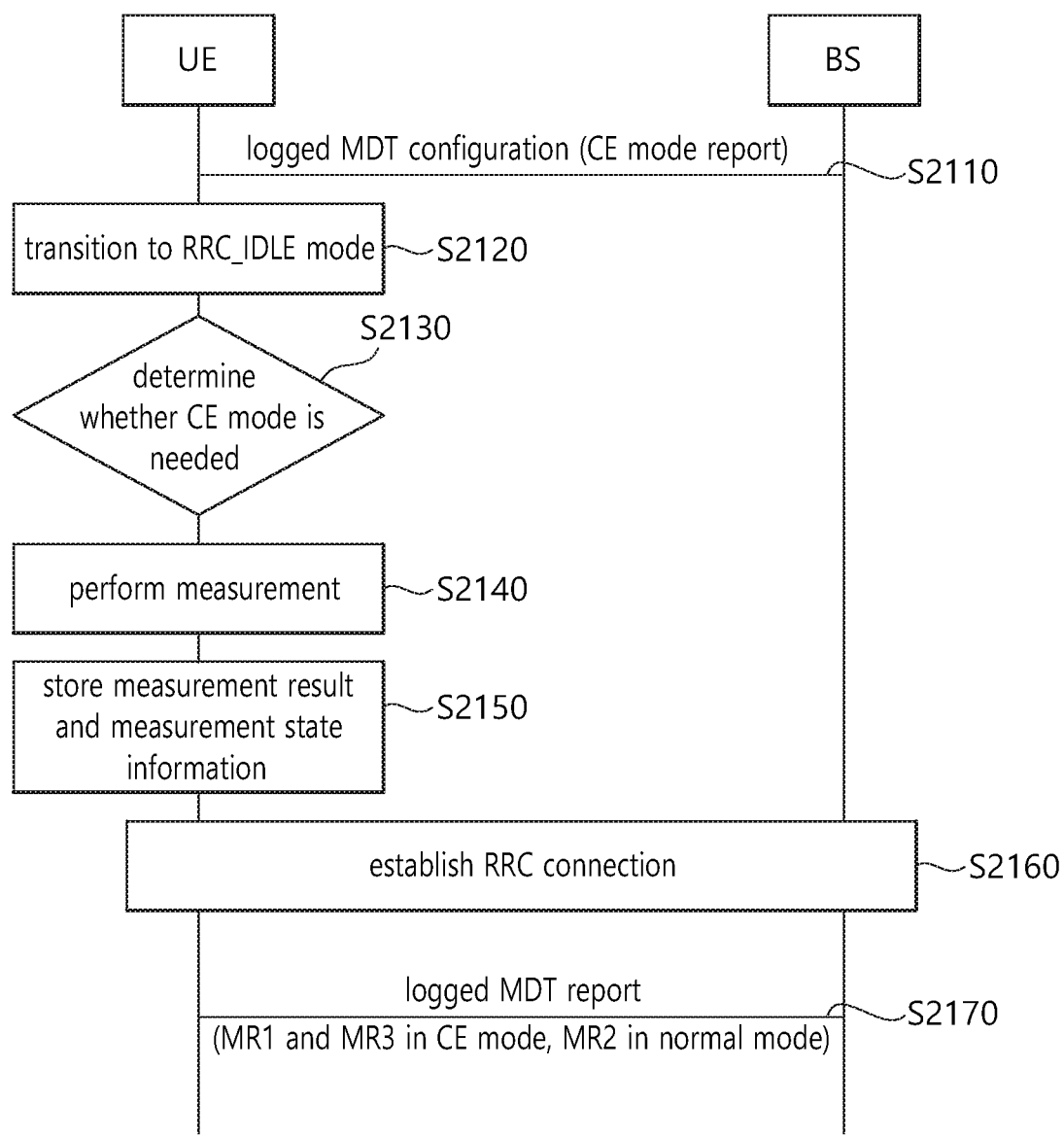
FIG. 21 shows a method of applying a logged measurement and report according to an embodiment of the present invention.

FIG. 21 shows a method of applying a logged measurement and report according to an embodiment of the present invention.

Referring to FIG. 21, the UE may configure a logged MDT measurement (S2110). The logged MDT measurement may include indicating that the UE is required/allowed to perform measurement in the CE mode and is to report a result obtained in the CE mode. The UE may transition to the RRC IDLE mode (S2120).

While performing measurement in the RRC_IDLE mode, the UE may determine whether CE-mode measurement is needed (S2130). Determining whether CE-mode measurement is needed may be based on an RSRP/RSRQ threshold received from a network, downlink reception, or on uplink transmission. In a case of determining whether CE-mode measurement is needed based on downlink reception, the UE may determine that CE-mode measurement is needed when it is needed to repeat a message greater than threshold times so that the UE accurately receives the message. Next, the UE may perform measurement in the CE mode (S2140). When measurement is performed in the CE mode, the UE may store a measurement result and measurement state information (S2150).

Subsequently, the UE may establish an RRC connection (S2160). Upon receiving a request from the network, the UE may report the logged measurement result and measurement state information (S2170). Assuming that MR1 and MR3 among the MR1, MR2 and MR3 are measured in the CE mode and MR2 is measured in the normal mode, the UE may report MR1, measurement state information on MR1, MR3, and measurement state information on MR3 together when reporting a measurement result. In addition, the UE may report not only a measurement result in the CE mode but also a measurement result in the normal mode. Therefore, the UE may also report MR2.

Figure 22:
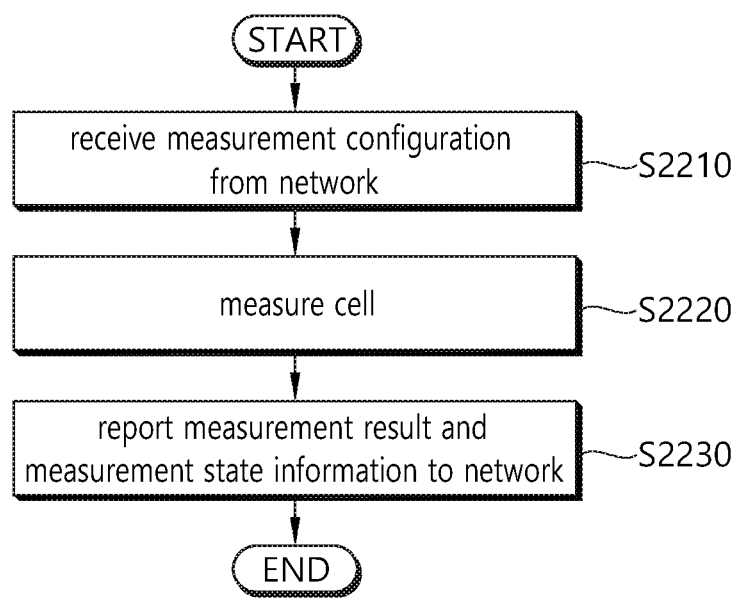
FIG. 22 shows a block diagram illustrating a method in which a UE in a coverage enhancement area reports a measurement result according to an embodiment of the present invention.

FIG. 22 shows a block diagram illustrating a method in which a UE in a coverage enhancement area reports a measurement result according to an embodiment of the present invention.

Referring to FIG. 22, the UE may receive a measurement configuration from a network (S2210). The UE may be in the RRC_IDLE state. The measurement configuration may include information on a coverage enhancement level needed for the UE for measurement. The coverage enhancement level may be set to one or more levels. The information on the coverage enhancement level may be explicitly set by the network, may be provided as an RSRP/RSRQ threshold, or may be provided as a threshold as to the number of repetition times necessary for successful uplink/downlink transmission/reception. The measurement configuration may include information on measurement periodicity (of a physical layer) required for the UE for measurement. The measurement configuration may include information on the number of RSRP/RSRQ samples required for the UE to perform measurement. The measurement configuration may include information indicating whether the UE reports measurement state information to the network. The measurement configuration may include information indicating whether to report not only a measurement result obtained in a coverage enhancement level but also a measurement result obtained in a non-coverage extension level. The measurement configuration may include information indicating a measurement offset for a cell/frequency corresponding to a coverage extension level. The measurement configuration may include information on a measurement target (that is, an intra LTE cell or an inter-RAT cell). The measurement configuration may include a period information indicator indicating that the UE performs only CE-mode measurement in a period indicated by the network. The measurement configuration may include a CE mode report indicator indicating that the UE reports only a measurement result obtained in the CE mode among measurement results of a cell.

The UE may perform measurement of a cell (S2220). When the measurement configuration includes a predefined RSRP threshold from the network and an RSRP threshold of the cell measured by the UE is the predefined RSRP threshold or lower, the cell may be measured in the CE mode. When the measurement configuration includes a predefined RSRQ threshold from the network and an RSRQ threshold of the cell measured by the UE is the predefined RSRQ threshold or lower, the cell may be measured in the CE mode. When the measurement configuration includes a predefined RSSI threshold from the network and an RSSI threshold of the cell measured by the UE is the predefined RSSI threshold value or lower, the cell may be measured in the CE mode. When the measurement configuration includes a threshold for downlink reception from the network and the number of times the UE performs repetitions for downlink reception exceeds the threshold for downlink reception, the cell may be measured in the CE mode. When the measurement configuration includes a threshold for uplink transmission from the network and the number of times the UE performs repetitions for uplink transmission exceeds the threshold for uplink transmission, the cell may be measured in the CE mode. When the measurement configuration includes a period information indicator, the cell may be measured in the CE mode during a period indicated by the period information indicator. The CE mode may be set to one or more levels, and level 0 may mean no coverage enhancement.

The UE may report a measurement result and measurement state information to the network (S2230). The measurement state information may include information indicating whether the cell is measured in the CE mode or in the normal mode. The measurement state information may include information on a coverage enhancement level. The CE mode refers to a mode in which the cell is measured based on a large number of samples for a longer time than in the normal mode. The measurement state information may include the number of times downlink reception is repeated for successful downlink reception or the number of times uplink transmission is repeated for successful uplink transmission. The measurement state information may include information indicating whether the cell is measured based on CSI-RS-based DRS measurement. When the UE receives a CE mode report indicator from the network, the UE may report only a result measured in the CE mode to the network among measurement results of the cell.

Figure 23:
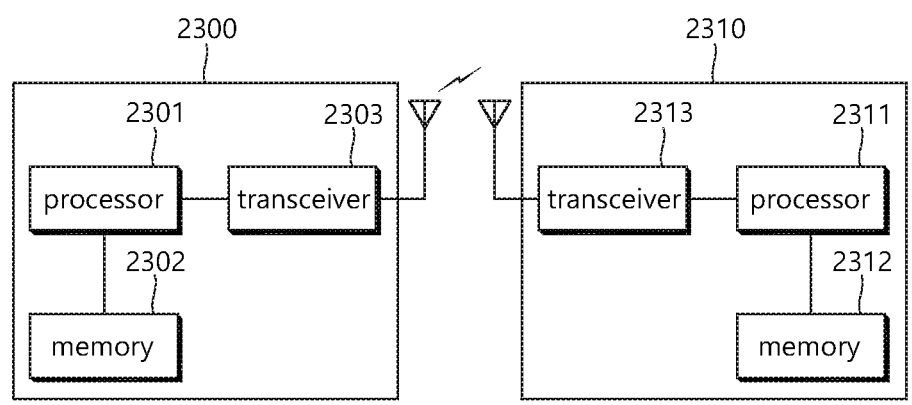
FIG. 23 is a block diagram illustrating a wireless communication system according to the embodiment of the present invention.

FIG. 23 is a block diagram illustrating a wireless communication system according to the embodiment of the present invention.

A BS 2300 includes a processor 2301, a memory 2302 and a transceiver 2303. The memory 2302 is connected to the processor 2301, and stores various information for driving the processor 2301. The transceiver 2303 is connected to the processor 2301, and transmits and/or receives radio signals. The processor 2301 implements proposed functions, processes and/or methods. In the above embodiment, an operation of the base station may be implemented by the processor 2301.

A UE 2310 includes a processor 2311, a memory 2312 and a transceiver 2313. The memory 2312 is connected to the processor 2311, and stores various information for driving the processor 2311. The transceiver 2313 is connected to the processor 2311, and transmits and/or receives radio signals. The processor 2311 implements proposed functions, processes and/or methods. In the above embodiment, an operation of the base station may be implemented by the processor 2311.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for reporting, by a user equipment (UE) in a coverage enhancement area, a measurement result in a wireless communication system, the method comprising:
receiving a measurement configuration including period information, a predefined first RSRP threshold for a first CE level and a predefined second RSRP threshold for a second CE level, from a network,
wherein the period information informs the UE that a cell is to be measured only in a coverage enhancement (CE) mode during a certain time duration included in the period information;
measuring the cell in the CE mode or a non-CE mode, based on the period information,
wherein the cell is measured for a longer time in the CE mode than in the non-CE mode,
wherein the cell is measured in the first CE level, when an RSRP of the cell measured by the UE exceeds the first RSRP threshold,
wherein the cell is measured in the second CE level, when the RSRP of the cell measured by the UE is the first RSRP threshold or lower, and when the RSRP of the cell measured by the UE exceeds the second RSRP threshold,
wherein the first RSRP threshold is greater than the second RSRP threshold, and
wherein the second CE level has a wider range of enhanced coverage than the first CE level;
reporting the measurement result of the measured cell to the network; and
reporting measurement state information including first information which informs the network whether the cell is measured in the CE mode or the non-CE mode, to the network.

2. The method of claim 1, wherein the measurement state information includes second information which informs the network that the measurement result in the CE mode has lower accuracy than the measurement result in the non-CE mode.

3. The method of claim 1, wherein the measurement state information includes a number of repetition times of downlink reception for successful reception of a particular message or a particular channel, or includes a number of repetition times of uplink transmission for successful transmission of a particular message or a particular channel.

4. The method of claim 1, wherein the measurement state information includes third information which informs the network whether the cell is measured based on CSI-RS-based DRS measurement.

5. The method of claim 1, wherein the measurement configuration includes a predefined RSRP threshold, and wherein the cell is measured in the CE mode, when an RSRP of the cell measured by the UE is the predefined RSRP threshold or lower.

6. The method of claim 1, wherein the measurement configuration includes a predefined RSRQ threshold, and
wherein the cell is measured in the CE mode, when an RSRQ of the cell measured by the UE is the predefined RSRQ threshold or lower.

7. The method of claim 1, wherein the measurement configuration includes a threshold for downlink reception, and
wherein the cell is measured in the CE mode, when a number of times the UE performs repetitions for downlink reception exceeds the threshold for downlink reception.

8. The method of claim 1, wherein the measurement configuration includes a threshold for uplink transmission, and
wherein the cell is measured in the CE mode, when a number of times the UE performs repetitions for uplink transmission exceeds the threshold for uplink transmission.

9. The method of claim 1, wherein the measurement configuration includes a CE mode report information, and
wherein the CE mode report information informs the UE that only a result measured in the CE mode is to be reported among measurement results of the cell.

10. The method of claim 1, wherein the measurement state information is reported to the network along with at least one of radio link failure information, handover failure information, a logged measurement result, or a measurement result on an MBSFN area.

11. The method of claim 1, wherein the cell is either an intra-LTE cell or an inter-RAT cell.

12. The method of claim 1, wherein the UE is in an RRC_IDLE state.

13. A user equipment (UE) reporting a measurement result in a wireless communication system, the UE comprising:
a memory;
a transceiver; and
a processor to connect the memory and the transceiver, wherein the processor is configured to:
control the transceiver to receive a measurement configuration including period information, a predefined first RSRP threshold for a first CE level and a predefined second RSRP threshold for a second CE level, from a network,
wherein the period information informs the UE that a cell is to be measured only in a coverage enhancement (CE) mode during a certain time duration included in the period information;
measure the cell in the CE mode or a non-CE mode, based on the period information, wherein the cell is measured for a longer time in the CE mode than in the non-CE mode,
wherein the cell is measured in the first CE level, when an RSRP of the cell measured by the UE exceeds the first RSRP threshold,
wherein the cell is measured in the second CE level, when the RSRP of the cell measured by the UE is the first RSRP threshold or lower, and when the RSRP of the cell measured by the UE exceeds the second RSRP threshold,
wherein the first RSRP threshold is greater than the second RSRP threshold, and
wherein the second CE level has a wider range of enhanced coverage than the first CE level;
control the transceiver to report the measurement result of the measured cell to the network; and
control the transceiver to report measurement state information including first information which informs the network whether the cell is measured in the CE mode or the non-CE mode, to the network.

* * * * *